(12) United States Patent
    Nadeau et al.

(10) Patent No.: US 9,606,321 B2
(45) Date of Patent: Mar. 28, 2017

(54) ENCLOSURE ASSEMBLIES HAVING CABLE CLAMPING INSERTS AND CABLE CLAMPING INSERTS FOR SUCH ENCLOSURES

(71) Applicant: HUBBELL INCORPORATED, Shelton, CT (US)

(72) Inventors: Gilles Nadeau, Laval (CA); Stéphane Lamarre, Contrecoeur (CA)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 15/045,537

(22) Filed: Feb. 17, 2016

(65) Prior Publication Data

US 2016/0238160 A1   Aug. 18, 2016

Related U.S. Application Data

(60) Provisional application No. 62/117,182, filed on Feb. 17, 2015, provisional application No. 62/175,700, filed on Jun. 15, 2015.

(51) Int. Cl.
    *H02G 3/02*    (2006.01)
    *G02B 6/44*    (2006.01)
    *H02G 3/08*    (2006.01)

(52) U.S. Cl.
    CPC ............. *G02B 6/4471* (2013.01); *H02G 3/02* (2013.01); *H02G 3/083* (2013.01)

(58) Field of Classification Search
    CPC combination set(s) only.
    See application file for complete search history.

(56) References Cited

U.S. PATENT DOCUMENTS

| | | | |
|---|---|---|---|
| 4,157,799 A | 6/1979 | Simon | |
| 4,277,641 A | 7/1981 | Bauer et al. | |
| 4,414,427 A | 11/1983 | Slater et al. | |
| 4,970,350 A | 11/1990 | Harrington | |
| 5,123,619 A * | 6/1992 | Tomlinson | F16L 3/08 24/16 R |
| 5,170,014 A | 12/1992 | Borsh | |
| 5,627,342 A | 5/1997 | Kramer | |

(Continued)

FOREIGN PATENT DOCUMENTS

| CA | 1 138 977 | 1/1983 |
|---|---|---|
| CA | 2 682 445 A1 | 4/2010 |
| CA | 2 788 787 A1 | 3/2013 |

OTHER PUBLICATIONS

Bridgeport Fittings Inc., Specification Sheet for Connectors—Zinc, Catalog ID: 2300-DC2; UPC No. 781747152305; 2014; 1 page.

(Continued)

*Primary Examiner* — Dhirubhai R Patel
(74) *Attorney, Agent, or Firm* — Ohlandt, Greeley, Ruggiero & Perle, L.L.P.

(57) ABSTRACT

A manufacturer installed cable clamping insert is provided that can be used to fix various sizes of non-metallic sheeted cables to an electrical outlet box. The insert can be oval in shape and can be used to secure the cable without a tool. In use, the cable is simply pushed through a flap of the insert to a desired position in the enclosure. The cables can be removed or readjusted simply by lifting the flap from inside of the enclosure.

21 Claims, 23 Drawing Sheets

(56) References Cited

U.S. PATENT DOCUMENTS

| | | | |
|---|---|---|---|
| 6,943,299 B1 * | 9/2005 | Daume | F16L 25/01 174/75 C |
| 7,459,643 B2 | 12/2008 | De la Borbolla | |
| 7,495,171 B2 | 2/2009 | Gorin et al. | |
| 7,582,829 B2 | 9/2009 | Yan | |
| 7,824,213 B1 | 11/2010 | Korcz et al. | |
| 8,487,196 B1 | 7/2013 | Baldwin et al. | |
| 8,791,374 B1 | 7/2014 | Smith | |
| 2007/0254525 A1 | 11/2007 | Pyron et al. | |
| 2009/0127802 A1 | 5/2009 | May et al. | |
| 2012/0024596 A1 | 2/2012 | Dilillo et al. | |

OTHER PUBLICATIONS

Bridgeport Fittings Inc., Specification Sheet for "U" Strap Type—Zinc, Catalog ID: 570-DC2; UPC No. 781747155702; 2014; 1 page.

Thomas & Betts, Specification Sheet for "Square Box"; Catalog No. 4-SDW-MXN; UPC No. 78172004141, 2014; 1 page.

International Search Report dated Jun. 3, 2016 from corresponding International Application No. PCT/US16/18176, 5 pages.

Written Opinion dated Jun. 3, 2016 from corresponding International Application No. PCT/US16/18176, 14 pages.

Examiner's Report dated Dec. 8, 2015 from corresponding Canadian Application 163811, 2 pages.

\* cited by examiner

ENCLOSURE ASSEMBLIES HAVING CABLE CLAMPING INSERTS AND CABLE CLAMPING INSERTS FOR SUCH ENCLOSURES

CROSS REFERENCE TO RELATED APPLICATIONS

This application claims the benefit of U.S. Provisional Application Ser. No. 62/117,182 filed on Feb. 17, 2015 and U.S. Provisional Application Ser. No. 62/175,700 filed on Jun. 15, 2015, the entire contents of both of which are incorporated by reference herein.

BACKGROUND

1. Field of the Disclosure

The present disclosure relates to enclosure assembles having cable clamping inserts. More particularly, the present disclosure is related to cable clamping inserts that are securable to openings of enclosures so as to fix one or more cables projecting from the openings.

2. Description of Related Art

Enclosures are known and are typically used to protect and shield connection between a first cable and another cable and/or a device. The cables can be electrical cables, optical cables, communication cables and the like. Thus, the term "enclosure" as used herein shall include any such enclosure such as, but not limited to, outlet boxes, gang boxes, device boxes, utility boxes, optical enclosures, communication enclosures, electrical panel enclosures, and others.

Many such enclosures include an opening through which the cables are inserted so as to make connection within the enclosure. In some prior art enclosures, the opening is covered with a removable member, often referred to as a "knockout". In these embodiments, the knockout is removed and an insert is installed to allow a cable to safely pass through the opening. Other prior art enclosures are provided having the inserts preinstalled by the manufacturer or having the insert integrally formed with the enclosure.

Unfortunately, it has been determined by the present disclosure that the prior art enclosures and/or inserts lack means to clamp the cables in place as they pass through the opening in an easy and compact, space saving manner.

Accordingly, it has been determined by the present disclosure that there is a need for cable clamping inserts and enclosures having such inserts that overcome, alleviate, and/or mitigate one or more of the aforementioned and other deleterious effects of the prior art.

SUMMARY

In some embodiments, a manufacturer installed cable clamping insert is provided that can be used to fix various sizes of non-metallic sheeted cables to an electrical outlet box. The insert can be oval in shape and can be used to secure the cable without a tool. In use, the cable is simply pushed through a flap of the insert to a desired position in the enclosure. The cables can be removed or readjusted simply by lifting the flap from inside of the enclosure.

In other embodiments, a pre-installed cable clamping insert is provided that allows for faster installation of non-metallic sheathed cable. Here, the insert provides more space within the enclosure for the ground wire fastening, cable placement and device insertion than possible with the prior art.

In still other embodiments, the faster cable installation is explained by the elimination of the tasks of removing the knockout and the fastening of cable in the enclosure, both of which were necessary with the prior art. In addition the pre-installed insert also eliminates the need to dispose of knockouts in the field—but rather can be disposed of at the manufacturer where they can easily be collected and recycled.

In one embodiment, an enclosure assembly is provided. The assembly includes an enclosure and a cable clamping insert. The enclosure has a lower surface and an opening defined through at least one wall. The cable clamping insert has an internal portion separated from an external portion by a ring stop and a cable passing opening defined therethrough. The internal portion has one or more upper retaining clips and one or more lower retaining clips. The upper and lower retaining clips have a cam surface and a locking surface. The cable clamping insert is in the opening with the one or more retaining clips proximate the lower surface so that the wall of the enclosure is disposed in a slot defined between the locking surfaces and the stop ring. The external portion has a living hinge resiliently securing a flap thereto so that the flap normally closes the cable passing opening.

In other embodiments alone or with one or more of the aforementioned or later mentioned embodiments, the opening and the cable clamping insert are oval and have a minor axis and a major axis.

In other embodiments alone or with one or more of the aforementioned or later mentioned embodiments, the one or more upper retaining clips includes two upper retaining clips.

In other embodiments alone or with one or more of the aforementioned or later mentioned embodiments, the one or more lower retaining clips includes one lower retaining clip.

In other embodiments alone or with one or more of the aforementioned or later mentioned embodiments, each of the two upper retaining clips partially circumvent the major axis and partially circumvent the minor axis, while the one retaining clip partially circumvents the major axis along both sides and completely circumvents the minor axis.

In other embodiments alone or with one or more of the aforementioned or later mentioned embodiments, the lower retaining clip includes a relief in the cam surface along the minor axis.

In other embodiments alone or with one or more of the aforementioned or later mentioned embodiments, the one or more lower retaining clips are longer than the one or more upper retaining clips.

In other embodiments alone or with one or more of the aforementioned or later mentioned embodiments, the assembly further includes lateral extensions defined on the flap extending towards the external portion.

In other embodiments alone or with one or more of the aforementioned or later mentioned embodiments, the lateral extensions include curved end regions defining an area of reduced cross section.

In other embodiments alone or with one or more of the aforementioned or later mentioned embodiments, the assembly further includes one or more fastener retainers configured retain a portion of an enclosure fastener.

In other embodiments alone or with one or more of the aforementioned or later mentioned embodiments, the one or more fastener retainers are configured to resiliently retain the enclosure fastener against the enclosure.

In other embodiments alone or with one or more of the aforementioned or later mentioned embodiments, the one or more fastener retainers further includes a plurality of protrusions formed in series.

In other embodiments alone or with one or more of the aforementioned or later mentioned embodiments, the one or more fastener retainers further include a terminal end having a retainer capturing hook or curve.

In one embodiment, a cable clamping insert is also provided. The insert includes an internal portion, an external portion, a ring stop, and a cable passing opening defined through the internal portion, the external portion, and the ring stop. The internal portion has one or more upper retaining clips and one or more lower retaining clips. The upper and lower retaining clips each have a cam surface and a locking surface. The external portion has a living hinge resiliently securing a flap thereto. The ring stop separates the internal and external portions with a slot defined between the locking surfaces and the stop ring.

In other embodiments alone or with one or more of the aforementioned or later mentioned embodiments, the internal portion, the external portion, and the ring stop are oval and have a minor axis and a major axis.

In other embodiments alone or with one or more of the aforementioned or later mentioned embodiments, the one or more upper retaining clips include two upper retaining clips.

In other embodiments alone or with one or more of the aforementioned or later mentioned embodiments, the one or more lower retaining clips includes one lower retaining clip.

In other embodiments alone or with one or more of the aforementioned or later mentioned embodiments, each of the two upper retaining clips partially circumvent the major axis and partially circumvent the minor axis, while the one lower retaining clip partially circumvents the major axis along both sides and completely circumvents the minor axis.

In other embodiments alone or with one or more of the aforementioned or later mentioned embodiments, the lower retaining clip includes a relief in the cam surface along the minor axis.

In other embodiments alone or with one or more of the aforementioned or later mentioned embodiments, the insert further includes lateral extensions defined on the flap extending towards the external portion.

In other embodiments alone or with one or more of the aforementioned or later mentioned embodiments, the lateral extensions include curved end regions defining an area of reduced cross section.

The above-described and other features and advantages of the present disclosure will be appreciated and understood by those skilled in the art from the following detailed description, drawings, and appended claims.

DETAILED DESCRIPTION

Figure 1:
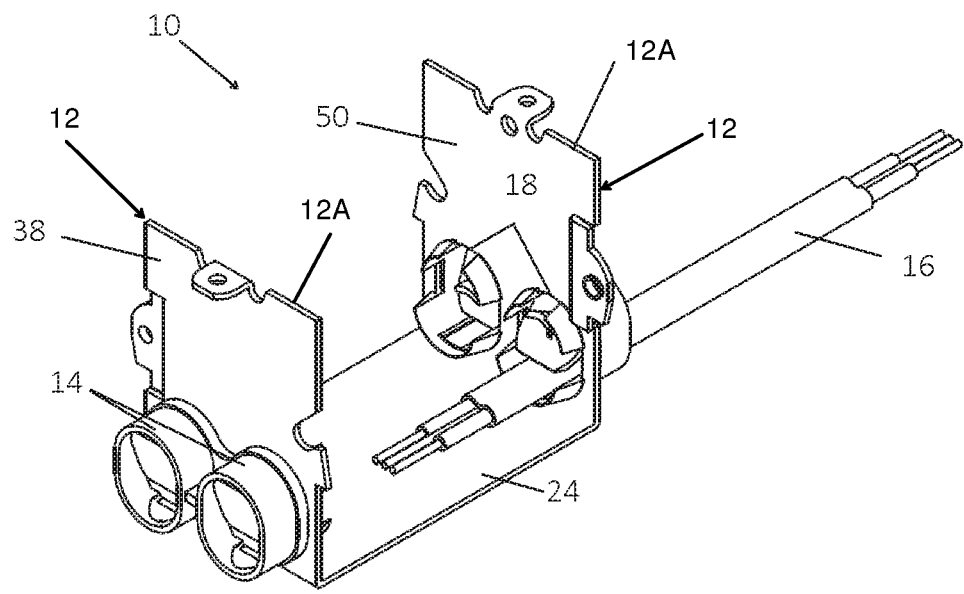
FIG. 1 is an isometric view of an exemplary embodiment of an enclosure assembly having cable clamping inserts according to the present disclosure.
Figure 2:
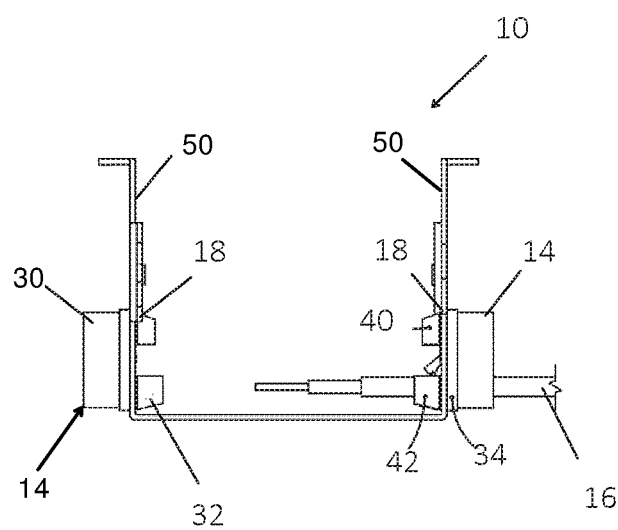
FIG. 2 is a side view of the enclosure assembly of FIG. 1.
Figure 3:
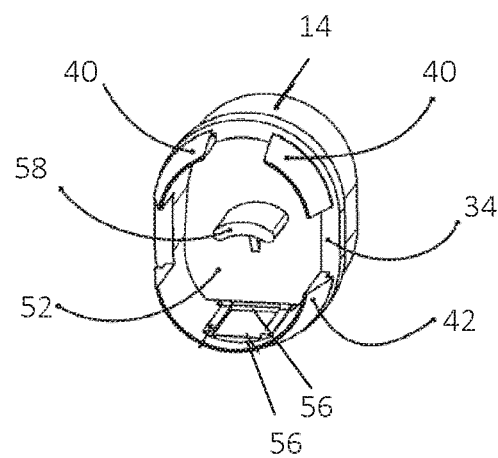
FIG. 3 is a rear isometric view of an exemplary embodiment of an insert according to the present disclosure.
Figure 4:
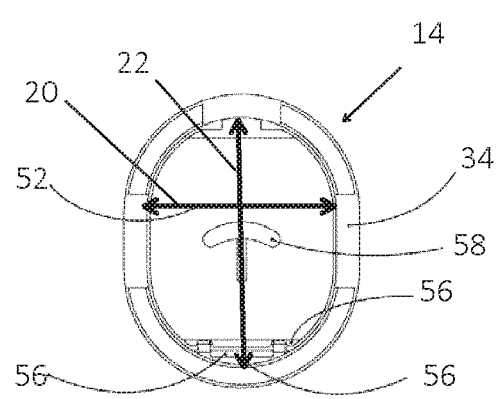
FIG. 4 is a rear view of the insert of FIG. 3.
Figure 5:
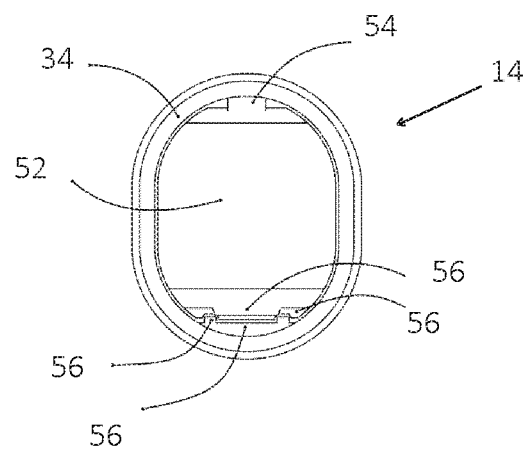
FIG. 5 is a front view of the insert of FIG. 3.
Figure 6:
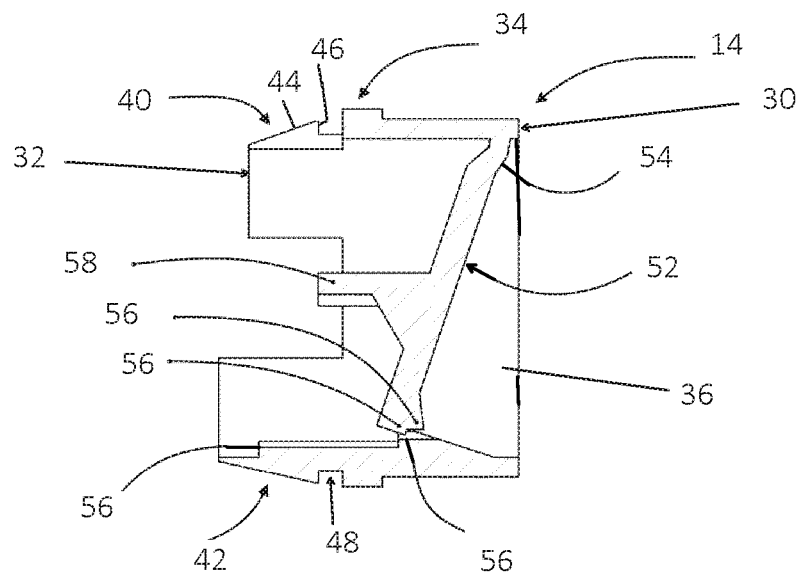
FIG. 6 is sectional view of the insert of FIG. 3 before installation of a cable.

Referring to the drawings and in particular to FIGS. 1 and 2, an enclosure assembly according to the present disclosure is shown and is generally referred to by reference numeral 10. Assembly 10 includes an enclosure 12 and one or more cable clamping inserts 14 (four shown). Advantageously, assembly 10 provides a simple yet efficient in structure that is very easy and cheap to manufacture and usable to fix non-metallic sheathed cables 16 to enclosure 12 in a simple, secure manner. Moreover, insert 14 uses less space in enclosure 12 than a traditional inserts, providing more space within the enclosure for device and wire attachments.

Enclosure 12 is illustrated by way of example as a double gang box, which has its sides removed for reasons of clarity and in use with an electrical cable 16. Of course, it is contemplated by the present disclosure for enclosure 12 to be any type of enclosure and for cable to be any type of cable.

Additionally, enclosure 12 is illustrated having two openings 18 on each wall 12a—with one insert 14 in each opening. In the illustrated embodiment, two inserts 14 are joined together as a unitary, single member in a manner that is sized and configured for simultaneous installation in two of openings 18. Stated another way, inserts 14 are illustrated in FIGS. 1 and 2 as being joined to one another in a manner that spans two openings 18. However, it is also contemplated by the present disclosure for inserts 14 to be separate from one another or to be joined together in a manner sufficient for installation into any desired number of openings 18—two openings, three openings, or more.

Insert 14 and opening 18 are, preferably, oval in shape having a major axis 20 and a minor axis 22. Advantageously, the oval shape of insert 14 and opening 18 prevent the insert from rotating within the opening. In this manner, insert 14 maintains a preferred orientation with respect to enclosure 12. Additionally, it has been determined by the present disclosure that oval opening 18, when present, provides additional room for cable 16 to pass into enclosure 12 than previously possible and at the same time minimizes the opening between the cable, the flap, and the inside of insert 14. Moreover, it is believed that the continuous oval shape of insert 14 provides additional rigidity and strength to the insert.

In the illustrated embodiment, insert 14 is illustrated having minor axis 22 parallel to a rear surface 24 of enclosure 12. Of course, it is contemplated by the present disclosure for enclosure 12 and/or insert 14 to be configured so that major axis 20 is parallel to rear surface 24.

Insert 14 is described in more detail with simultaneous reference to FIGS. 3-7.

Insert 14 includes a first or external portion 30, a second or internal portion 32, which are separated from one another by a stop ring 34, and a cable passing opening 36 defined therethrough.

Stop ring 34 depends upwardly from an outer surface of insert 14 and has an outer diameter that is larger than a diameter of opening 18 of enclosure 12. During installation of insert 14 into opening 18 of enclosure 12, internal portion 32 is placed into the opening until stop ring 34 abuts an outer surface 38 of the enclosure. In this manner, stop ring 34 ensures proper positioning of insert 14 in enclosure 12, with external portion 30 extending outside of the enclosure 12.

Internal portion 32 includes one or more upper retaining clips 40 and one or more lower retaining clip 42. Clips 40, 42 are cantilevered beams depending from stop ring 34 and include a cam surface 44 and locking surface 46. Locking surface 46 and stop ring 34 combine to form an enclosure receiving slot 48.

During installation of insert 14 into enclosure 12, outer surface 38 of the enclosure around opening 18 acts on cam surfaces 44 to deflect or bend clips 40, 42 inwardly towards cable passing opening 36. When cam surfaces 44 pass through opening 18, clips 40, 42 resiliently return to a normal or unbiased position with enclosure 12 secured between locking surface 46 and stop ring 34 in slot 48 so as to prevent inadvertent withdrawal of insert 14 from enclosure 12. In this installed position, stop ring 34 faces outer surface 38 of enclosure 12 and locking surface 46 faces an inner surface 50 of the enclosure.

In some embodiments, insert includes two upper retaining clips 40 and one retaining clip 42. Each of upper retaining clip 40 is partially circumvents major axis 20 and partially circumvents minor axis 22, while lower retaining clip 42 partially circumvents major axis 20 along both sides and completely circumvents the minor axis at the lower side. Additionally, lower retaining clip 42 preferably extends inward from stop ring 34 a longer distance than upper retaining clips 40. When installed, lower retaining clip 42 is proximate rear surface 24 of enclosure and upper retaining clips 40 are remote from the rear surface of the enclosure. Thus and without wishing to be bound by any particular theory, the relatively short length of upper retaining clips 40 relative to lower retaining clip 42—combined with the open areas between the upper and lower clips and the open areas between the upper clips themselves—combine to minimize the consumption of the internal volume of enclosure 12.

Additionally, it has been determined by the present disclosure that increasing the length of lower retaining clip 42, combined with the lower retaining clip partially circumventing major axis 20 along both sides and completely circumventing the minor axis 22 at the lower side provides a smooth supporting surface for cable 16 as the cable installed through cable passing opening 36.

In some embodiments, the outermost diameter of cam surfaces 44 on upper and lower clips 40, 42 is, preferably, equal to or less than an outermost diameter of stop ring 34. In this manner, the user can be assured that any interference between adjacently installed inserts 14 occurs at stop rings 34 ensuring firm connection by clips 40, 42 to enclosure 12.

Figure 7:
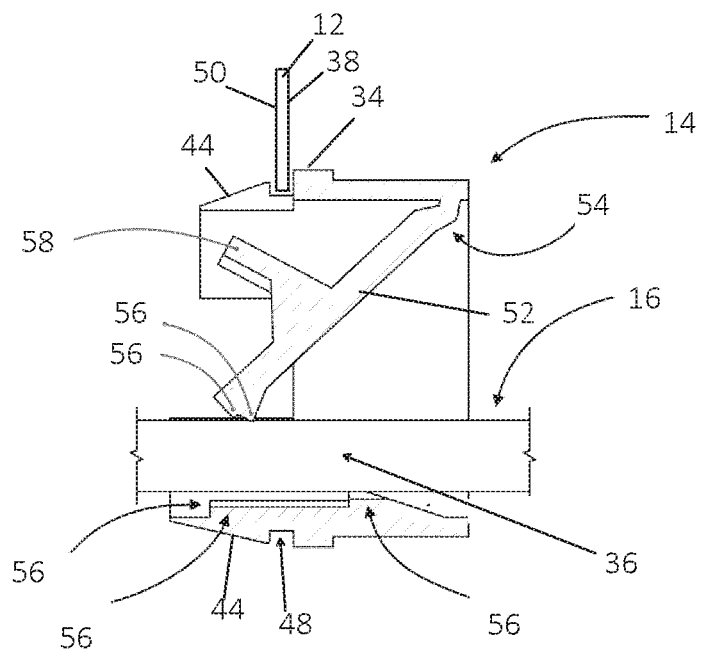
FIG. 7 is a sectional view of the insert of FIG. 3 after installation of a cable.

Insert 14 further includes a flap or door 52 depending from outer portion 32 via a living hinge 54. Flap 52 is configured to close, at least partially, cable passing opening 36 in a normal position (FIG. 6), but to be resiliently flexed by cable 16 when passed through cable passing opening 36 (FIG. 7). More particularly, flap 52 is preferably resiliently biased by, for example, hinge 54 towards the normal position of FIG. 6. In this manner, flap 52 is biased into contact with cable 16 when the cable is installed in cable passing opening 36 as illustrated in FIG. 7. Hinge 54 is configured, in some embodiments, to have a return force of between 5 and 10 pounds. Thus during installation, it is necessary for cable 16 to insert more than 5 to 10 pounds of force onto flap 52.

Insert 14 can include, in some embodiments, one or more features to prevent or mitigate inadvertent withdrawal of cable 16 from opening 36. For example, insert can include one or more beveled ramps or teeth 56 on outer portion 30, inner portion 32, flap 52, and any combinations thereof. In some embodiments, insert 14 includes ramps 56 at different levels to provide friction for various sizes of cable 16.

In the illustrated embodiment, insert 14 includes beveled ramps 56 on a lower surface outer portion 30 and on a bottom surface of flap 52—which act together to apply friction to cable 16 so as to prevent or at least mitigate the cable from being inadvertently withdrawn from opening 36 as illustrated in FIG. 7, while decreasing the friction applied to the cable as it is inserted through opening 38. Here, ramps 56 can further be configured to abut one another in the normal position illustrated in FIG. 6 so as prevent flap 52 from being rotated outward past the normal position.

In some embodiments, flap 52 can include a grip 58 extending therefrom towards internal portion 32, which allows a user to lift the flap from contacting cable 16 so that the cable can be removed or readjusted. Of course, it is contemplated by the present disclosure for a user to lift flap 52 from contacting cable 16 by merely pushing on an outer surface of the flap so that the cable can be removed or readjusted.

Figure 8:
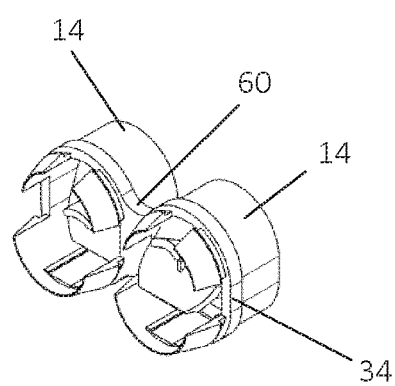
FIG. 8 is a rear isometric view of an alternate exemplary embodiment of an insert according to the present disclosure.
Figure 9:
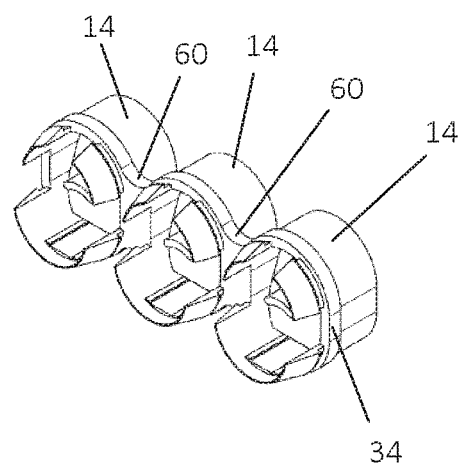
FIG. 9 is a rear isometric view of another alternate exemplary embodiment of an insert according to the present disclosure.

Referring now to FIGS. 8 and 9, alternate exemplary embodiments of inserts 14 according to the present disclosure are shown. In FIG. 8, two inserts 14 are illustrated having a web 60 joining the inserts to one another as a one-piece device. Similarly, FIG. 9 illustrates three inserts 14 joined together into a one-piece device by webs 60. In this manner, insert 14 of the present disclosure can take on any desired shape to match the openings 18 of enclosure 12 through which it is desired to insert cable 16.

It should be recognized that inserts 14 are illustrated in FIGS. 8 and 9 joined by web(s) 60 in a side-by-side configuration, namely so that the inserts are disposed with minor axis 22 of each insert coincident with one another. Of course, it is contemplated by the present disclosure for inserts 14 to be joined in any desired manner such as, but not limited to, disposed with major axis 20 of each insert coincident with one another, disposed with minor axis 22 of each insert parallel but offset from one another, disposed with the major axis of each insert parallel but offset from one another, disposed with the minor axes angled with respect to one another, disposed with the major axes angled with respect to one another, and any combinations thereof.

Figure 10:
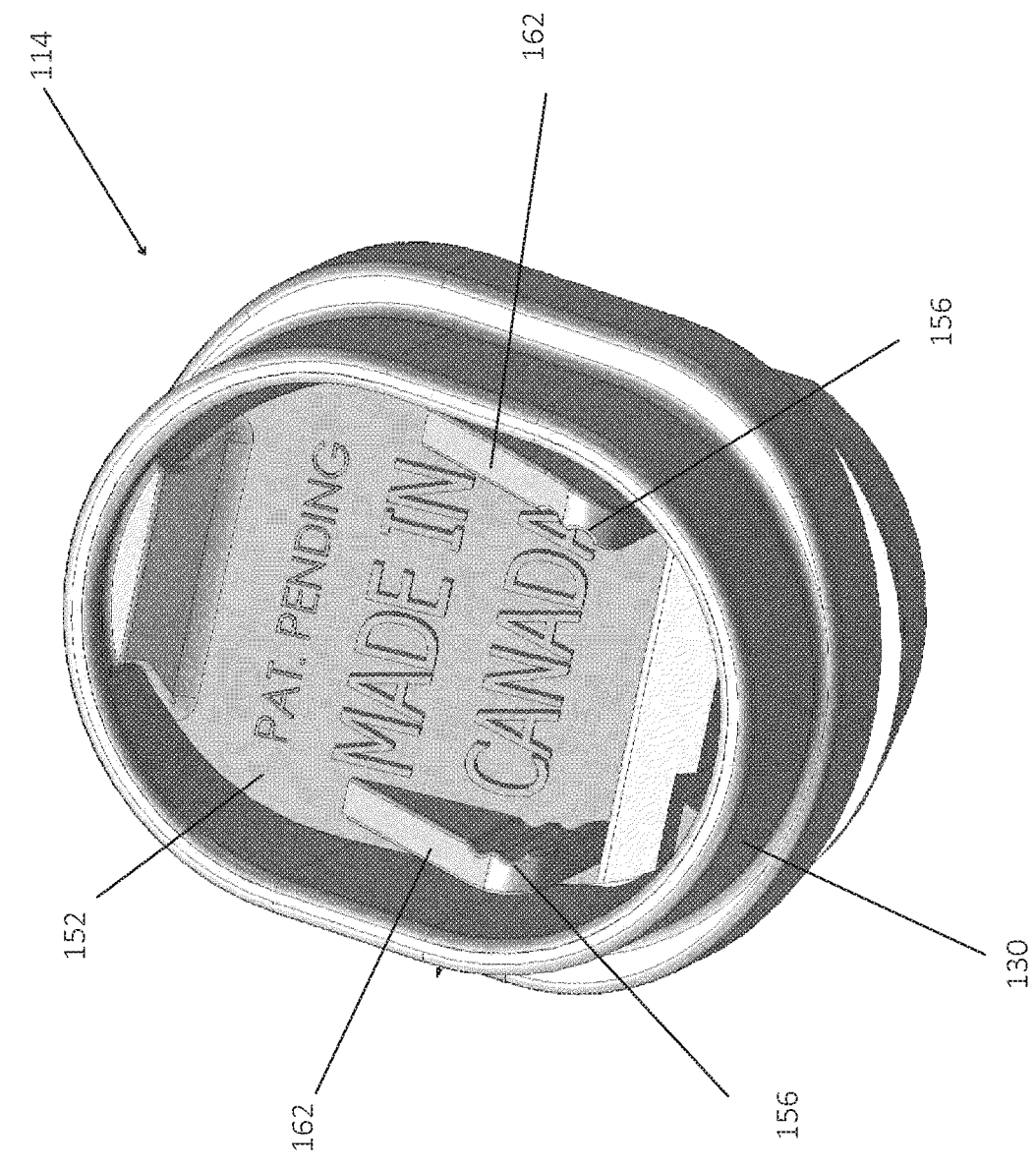
FIG. 10 is a front isometric view of an alternate exemplary embodiment of an insert according to the present disclosure.
Figure 11:
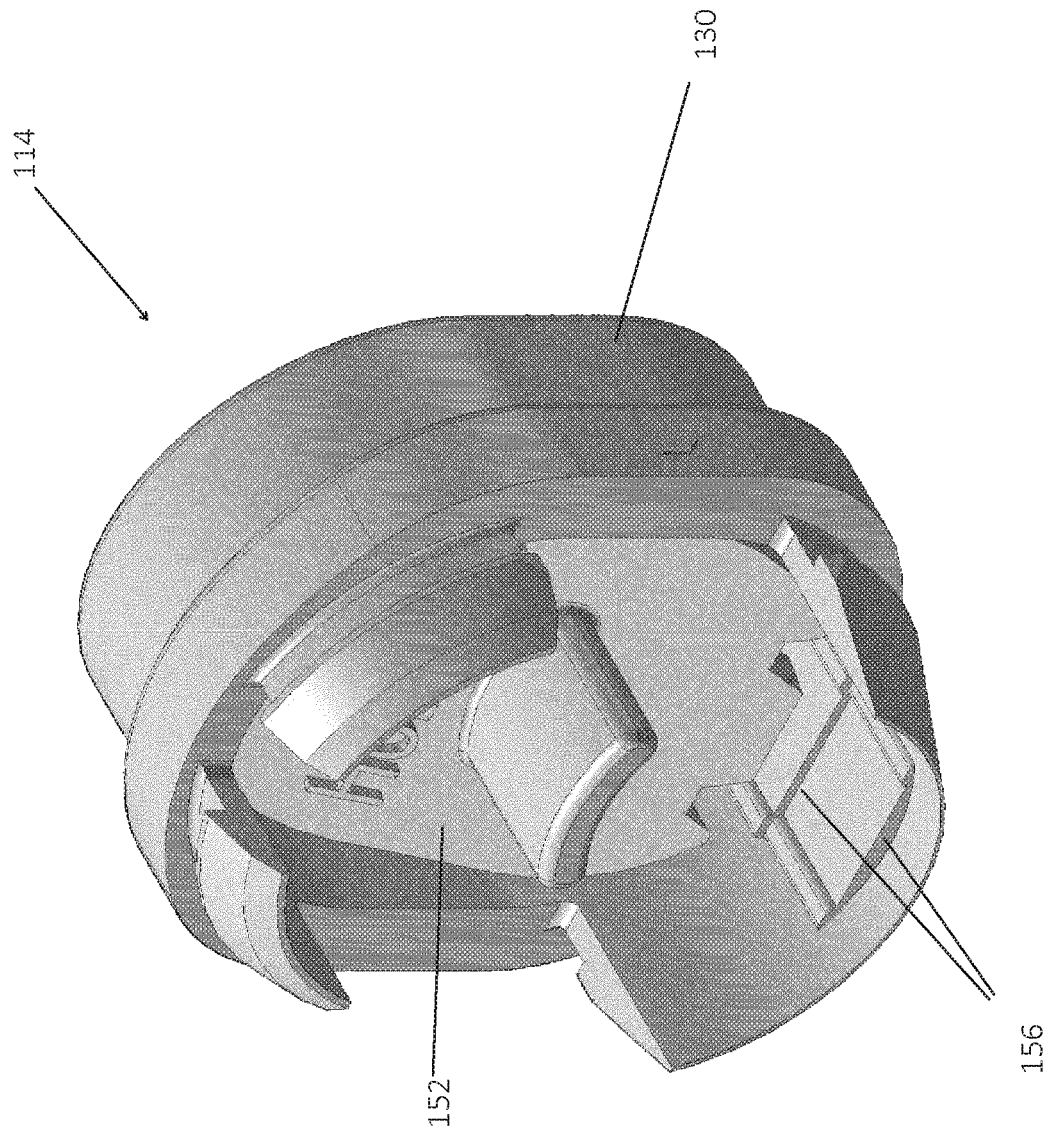
FIG. 11 is a rear isometric view of the insert of FIG. 10.
Figure 12:
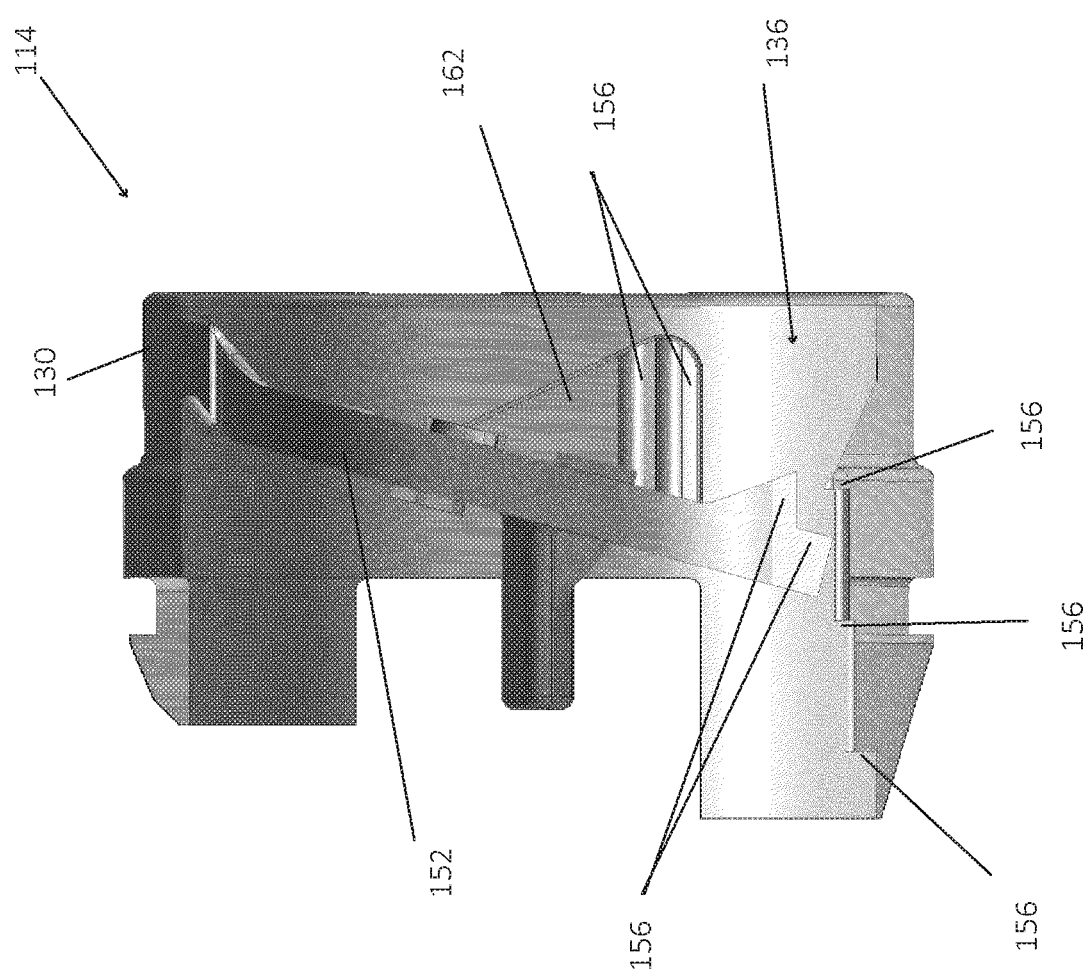
FIG. 12 is a sectional view of the insert of FIG. 11 before installation of a cable.

Referring now to FIGS. 10-12, another alternate exemplary embodiment of an insert according to the present disclosure is shown and is generally referred to by reference numeral 114. In this embodiment of insert 114 component parts performing similar or analogous functions to those discussed above with respect to insert 14 are labeled in multiples of 100.

Insert 114 includes a flap or door 152 that has a pair of lateral extensions 162 defined thereon and extending towards external portion 130. Extensions 162 are sized and positioned and configured so that, when flap 152 is pivoted inward after insertion of the cable, the extensions reduce the area of open space through cable passing opening 136. Stated another way, extensions 162 cover or shield the side edges of the cable passing through opening 136, while flap 152 covers or shields the top edge of the cable and the lower surface of insert 114 covers or shields the bottom edge of the cable.

In some embodiments, one or more of external portion 130, flap 152, and extensions 162 can include one or more ramps or teeth 156 disposed thereon which act together to apply friction to the cable so as to prevent or at least mitigate the cable from being inadvertently withdrawn from opening 136. The ramps 156, when present, can be provided, at different levels to provide friction for various sizes of the cable.

Figure 13:
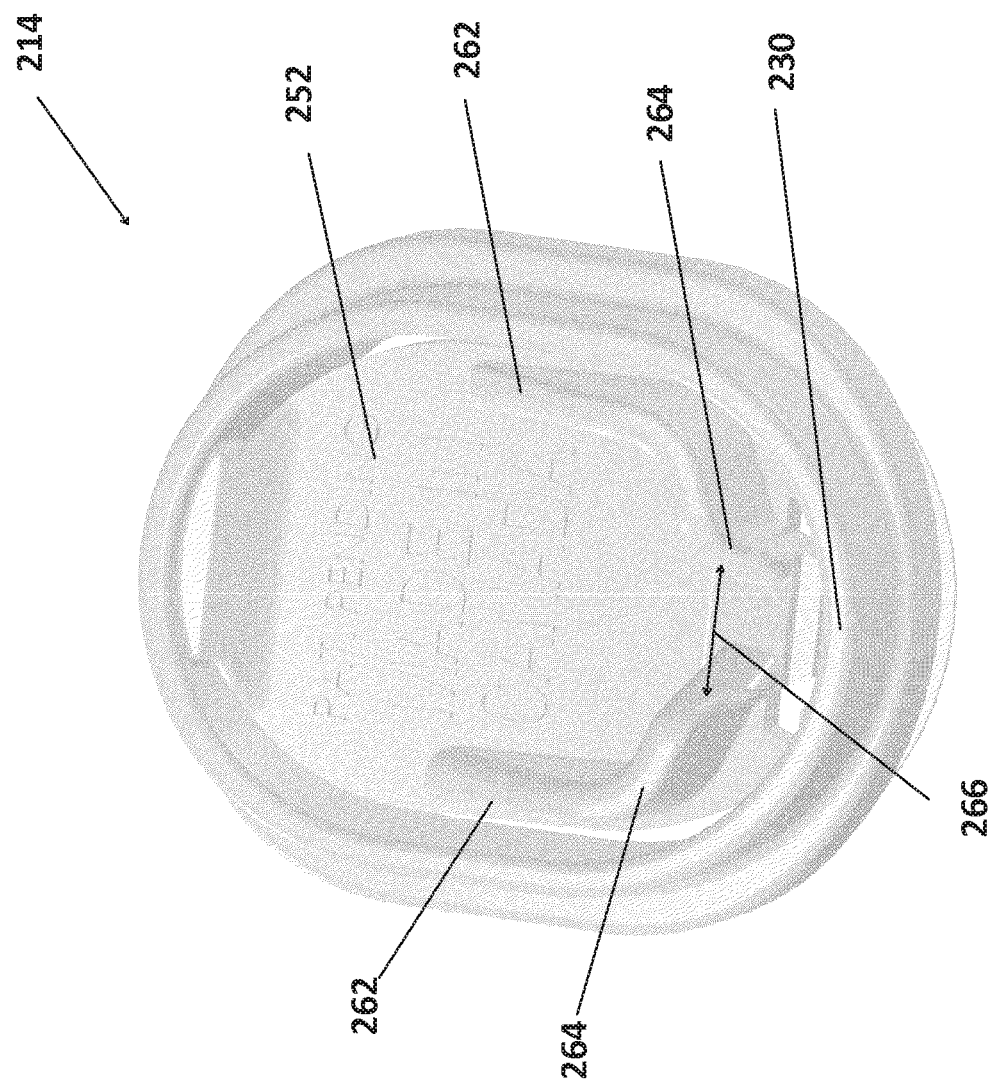
FIG. 13 is a front isometric view of an alternate exemplary embodiment of an insert according to the present disclosure.
Figure 14:
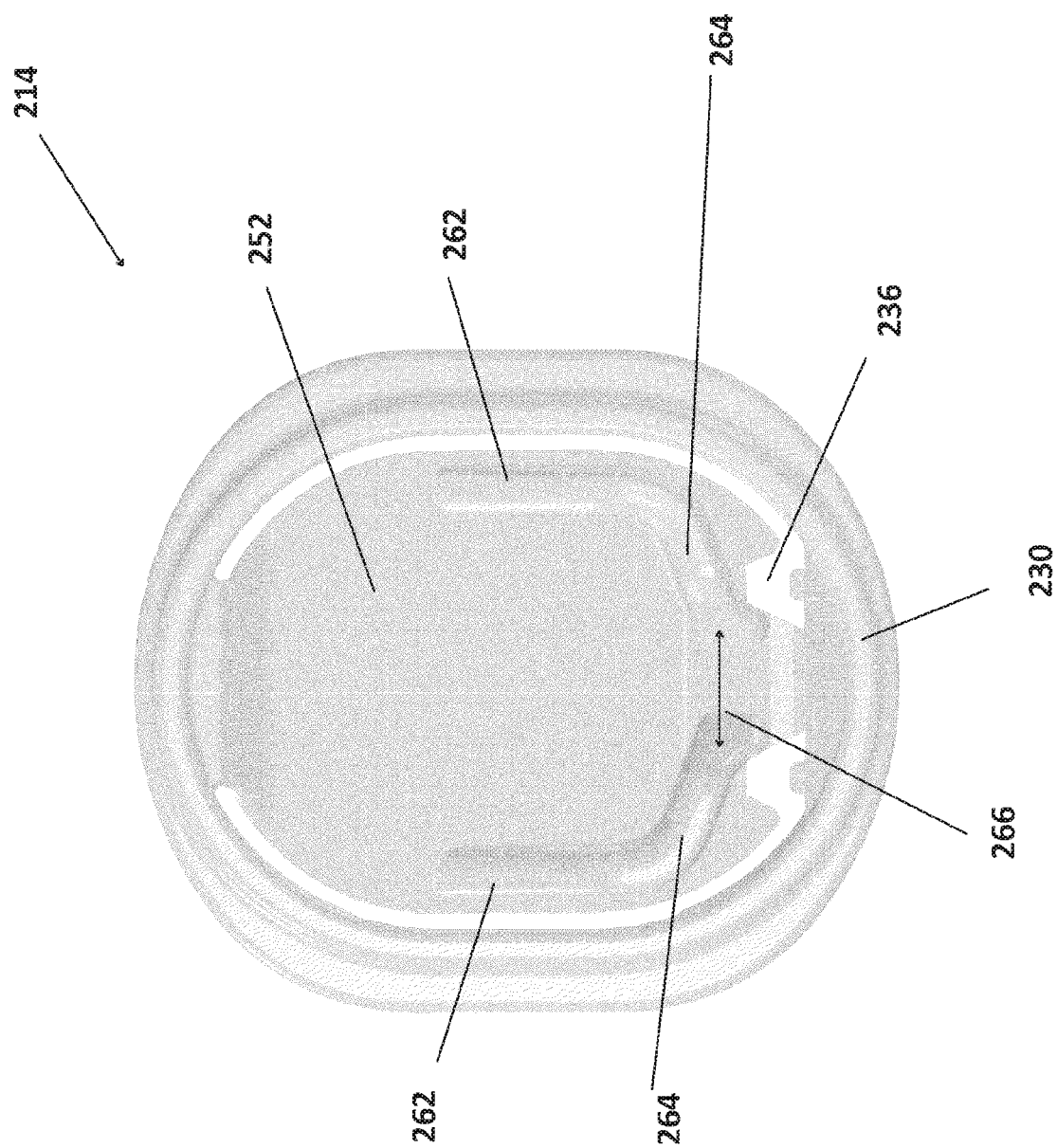
FIG. 14 is a front view of the insert of FIG. 13.
Figure 15:
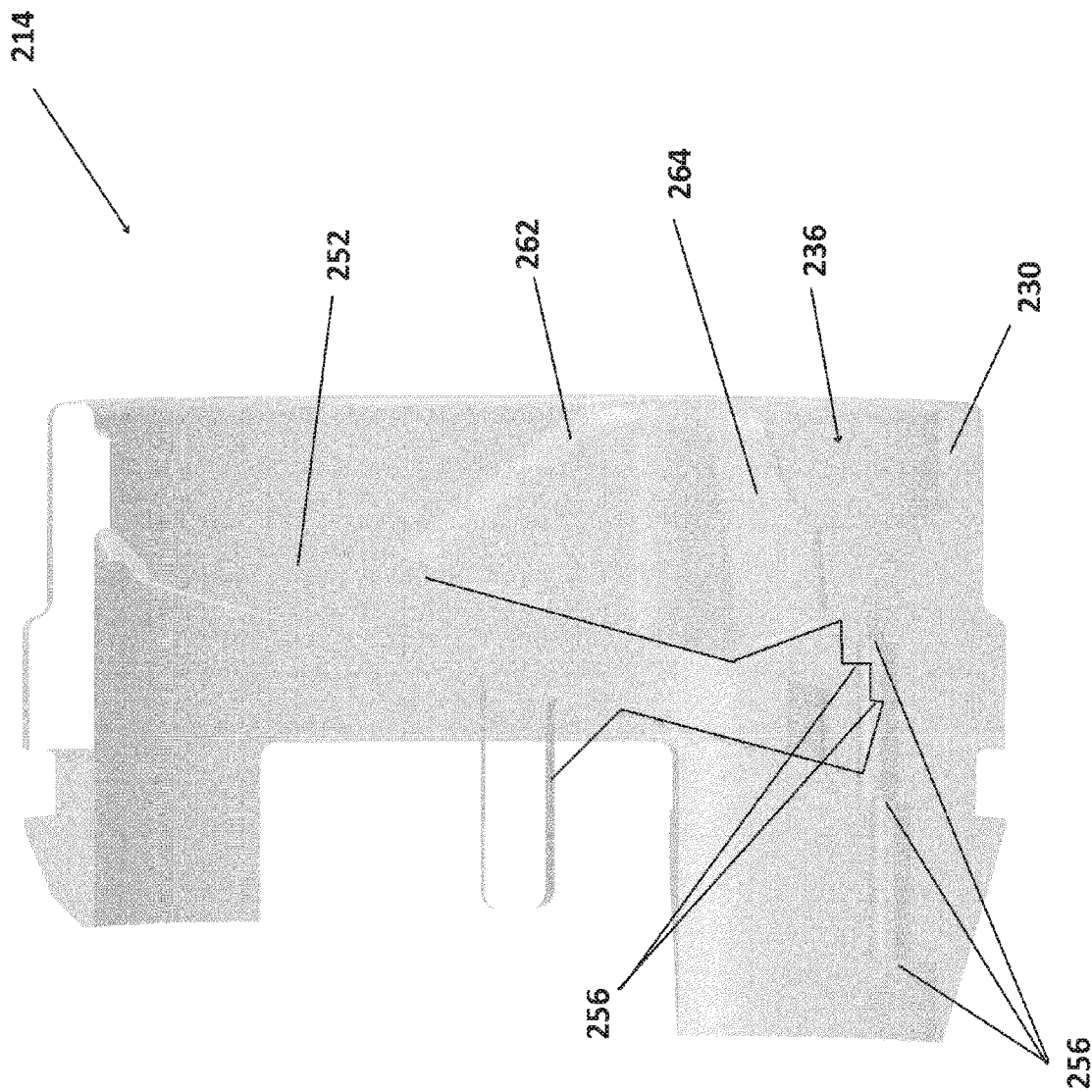
FIG. 15 is a sectional view of the insert of FIG. 13 before installation of a cable.

Referring now to FIGS. 13-15, another alternate exemplary embodiment of an insert according to the present disclosure is shown and is generally referred to by reference numeral 214. In this embodiment of insert 214 component parts performing similar or analogous functions to those discussed above with respect to inserts 14 and/or 114 are labeled in multiples of 200.

Insert 214 includes a flap or door 252 that has a pair of lateral extensions 262 defined thereon and extending towards external portion 230. Extensions 262 are sized and positioned and configured so that, when flap 252 is pivoted inward after insertion of the cable, the extensions reduce the area of open space through cable passing opening 236. Stated another way, extensions 262 cover or shield the side edges of the cable passing through opening 236, while flap 252 covers or shields the top edge of the cable and the lower surface of insert 214 covers or shields the bottom edge of the cable.

Additionally and differing from the embodiment of extensions 162 discussed above with respect to insert 114, insert 214 further includes curved end regions 264 depending from extensions 262. End regions 264 provide an area of reduced cross section 266 that provides further cover or shield to the side edges of the cable passing through opening 236 and assists in gripping and/or guiding the cable. In some embodiments, end regions 264 can be tapered to further assist in guiding the cable through opening 236.

In some embodiments, one or more of external portion 230, flap 252, extensions 262 (not shown), and regions 264 (not shown) can include one or more ramps or teeth 256 disposed thereon which act together to apply friction to the cable so as to prevent or at least mitigate the cable from being inadvertently withdrawn from opening 236. The ramps 256, when present, can be provided, at different levels to provide friction for various sizes of the cable.

Figure 16:
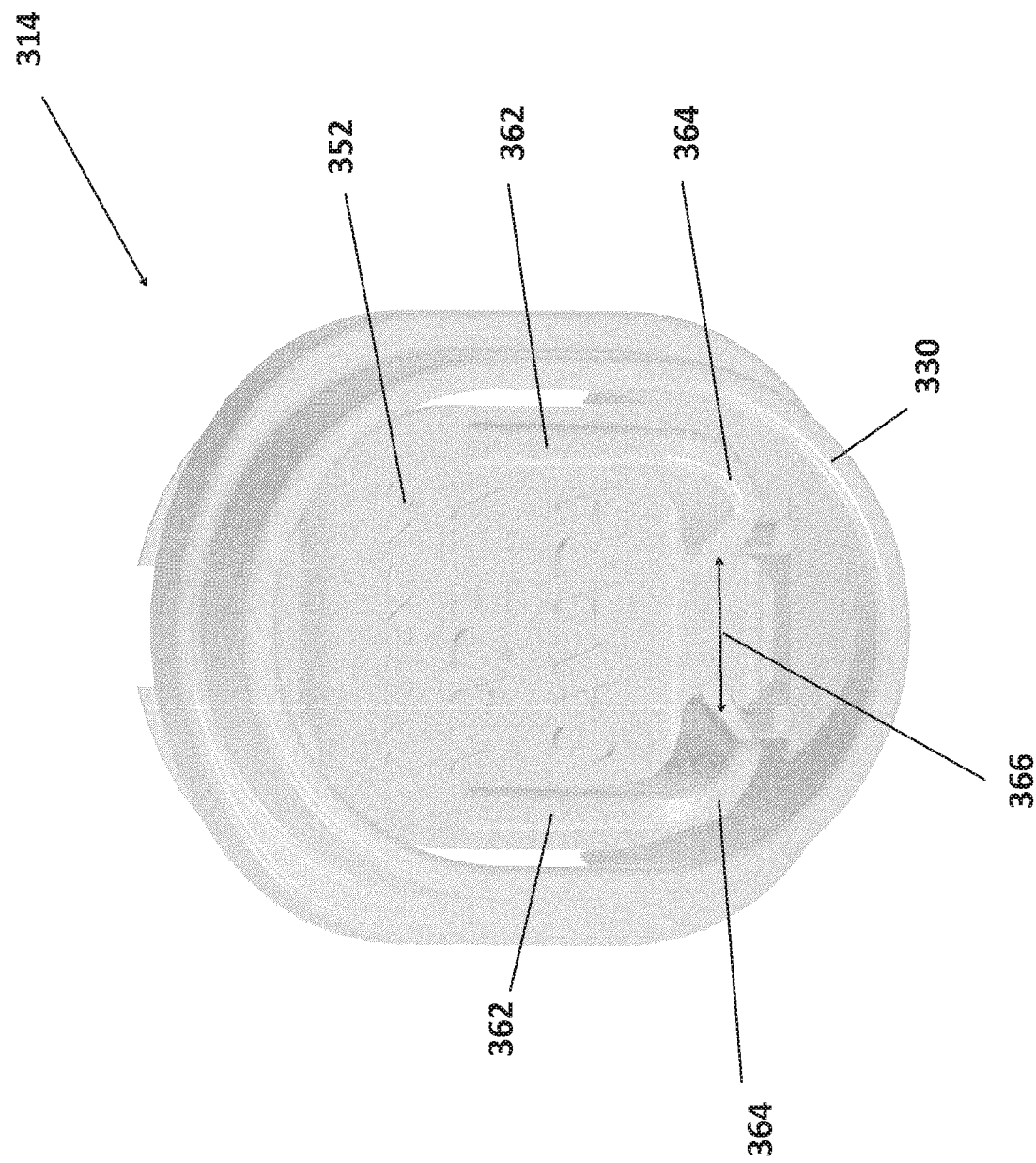
FIG. 16 is a front isometric view of another alternate exemplary embodiment of an insert according to the present disclosure.
Figure 17:
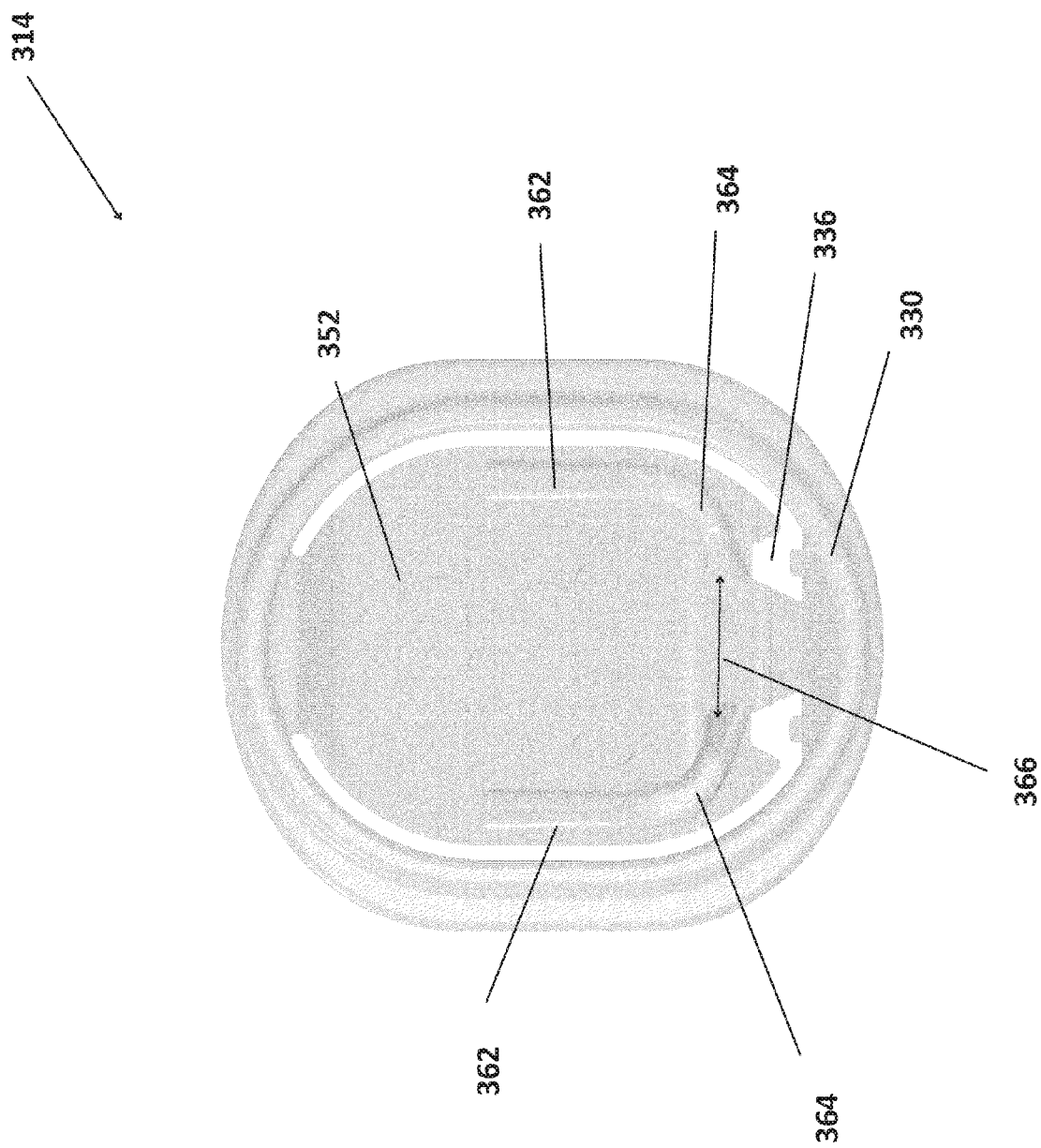
FIG. 17 is a front view of the insert of FIG. 16.
Figure 18:
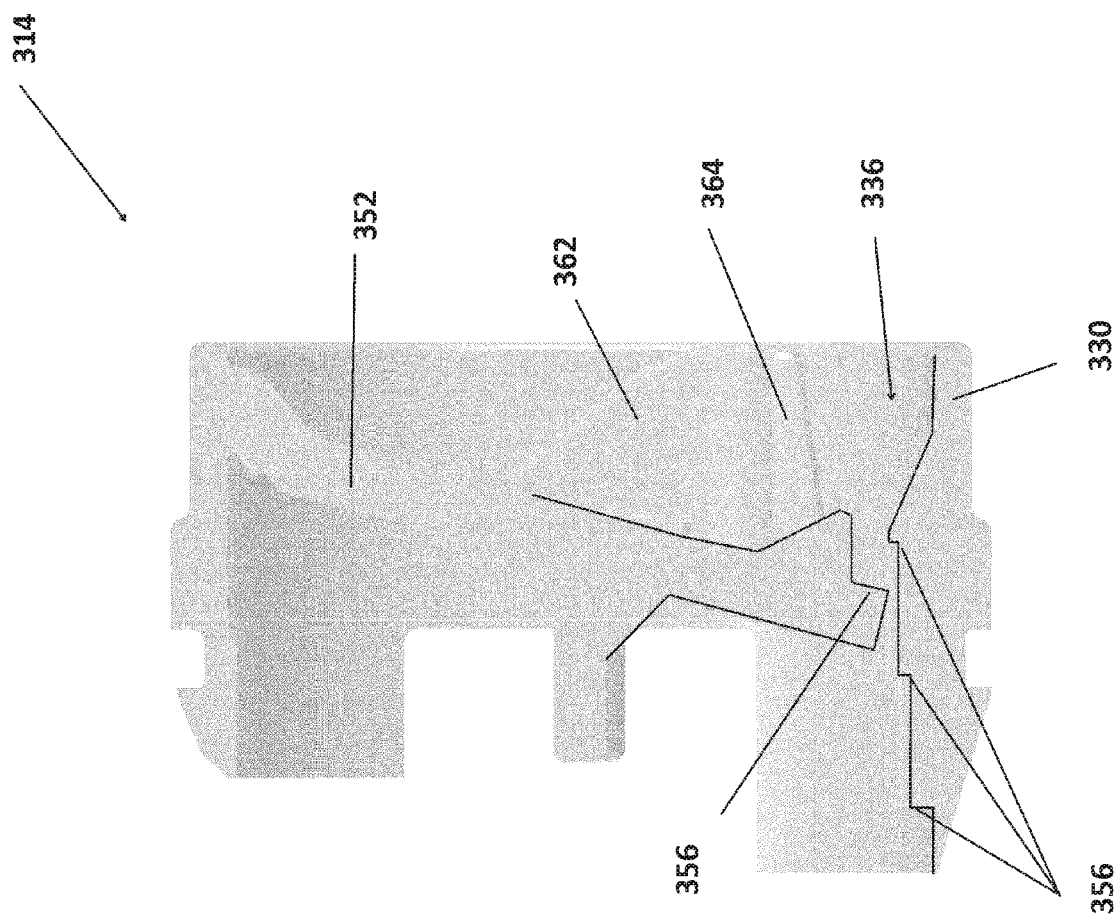
FIG. 18 is a sectional view of the insert of FIG. 16 before installation of a cable.
Figure 19:
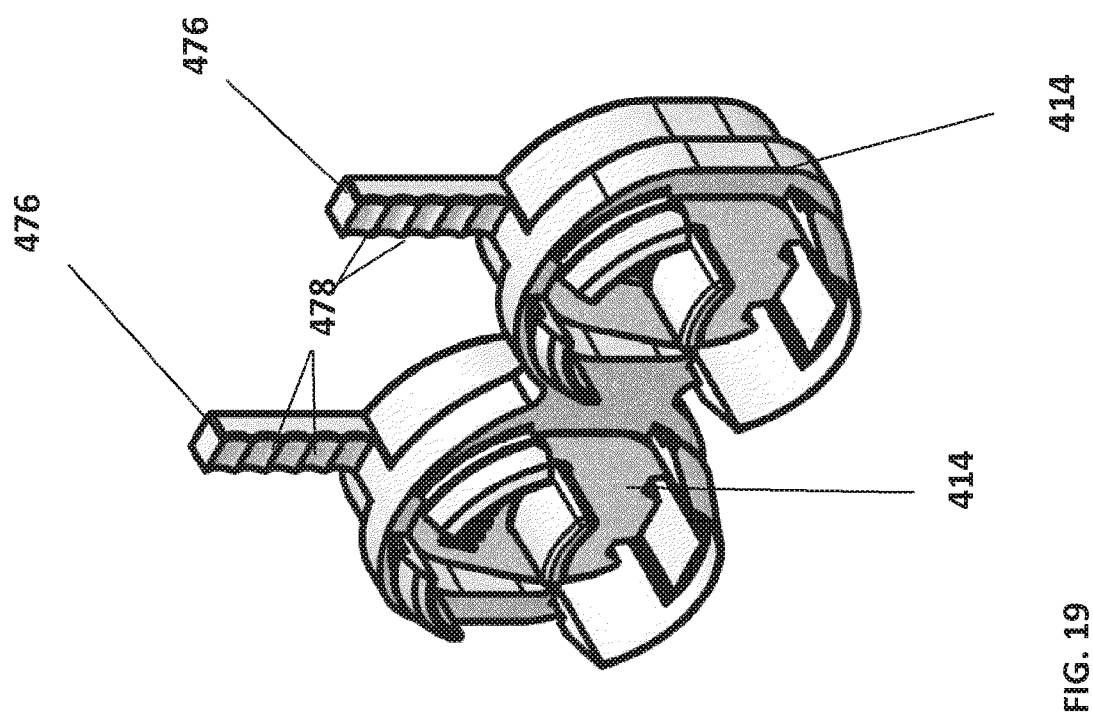
FIG. 19 is a rear isometric view of yet another exemplary embodiment of an insert according to the present disclosure.

Referring now to FIGS. 16-18, another alternate exemplary embodiment of an insert according to the present disclosure is shown and is generally referred to by reference numeral 314. In this embodiment of insert 314 component parts performing similar or analogous functions to those discussed above with respect to inserts 14, 114, and/or 214 are labeled in multiples of 300.

Insert 314 is substantially similar to insert 214 and, therefore includes a flap or door 352 that has a pair of lateral extensions 362 defined thereon and extending towards external portion 330. Extensions 362 are sized and positioned and configured so that, when flap 352 is pivoted inward after insertion of the cable, the extensions reduce the area of open space through cable passing opening 336.

Additionally, insert 314 further includes curved end regions 364 depending from extensions 362. End regions 364 provide an area of reduced cross section 366 that provides further cover or shield to the side edges of the cable passing through opening 336 and assists in gripping and/or guiding the cable. In some embodiments, end regions 364 can be tapered to further assist in guiding the cable through opening 336.

In some embodiments, one or more of external portion 330, flap 352, extensions 362 (not shown), and regions 364 (not shown) can include one or more ramps or teeth 356 disposed thereon which act together to apply friction to the cable so as to prevent or at least mitigate the cable from being inadvertently withdrawn from opening 336. The ramps 356, when present, can be provided, at different levels to provide friction for various sizes of the cable.

Referring now to FIGS. 19-22, another alternate exemplary embodiment of an insert according to the present disclosure is shown and is generally referred to by reference numeral 414. In this embodiment of insert 414 component parts performing similar or analogous functions to those discussed above with respect to inserts 14, 114, 214, and/or 314 are labeled in multiples of 400. Insert 414 is shown in use in FIGS. 20-22 with enclosures 412 of differing sizes. For ease of discussion, two inserts 414 are shown formed as a unitary, single member, but of course other configurations are contemplated by the present disclosure.

Enclosures 412—such as those currently available on the market—typically includes one or more fastener openings 470-1, 470-2 on one side and one or more fastener openings 472-1, 472-2 on the opposite side. When securing the enclosure 412 to a support structure, a fastener 474 such as a nail, screw, bolt or other fastener is passed through one of fastener openings 470-1, 470-2 and one of fastener openings 472-1, 472-2 and into the support structure.

It has been determined by the present disclosure that some prior art enclosures 412 have fastener openings 470-1, 470-2, 472-2, 472-2 configured in such a manner that use of insert 414 prevents fastener 474 from being passed through openings on opposite sides. Simply, insert 414—when used with some prior art enclosures 412—interferences with the user's ability to pass fastener 474 through fastener openings 470-1, 470-2, 472-1, 472-2 on the opposite sides.

Advantageously, insert 414 includes one or more fastener retainers 476 depending therefrom (only one shown). In some embodiments, retainers 476 are configured to at least resiliently urge fastener 474 towards enclosure 412 so as to retain at least one side of the fastener without passing through fastener openings 470-1, 470-2, 472-1, 472-2 on opposite sides. Thus and as illustrated, fastener 474 can be passed through a fastener opening on only one side (e.g., opening 470-1 or 470-2, but not opening 472-1 or 472-2) and is still retained in a desired position by retainer 476.

In other embodiments alone or in combination with the resilient retaining discussed above, retainer 476 can include one or more protrusions 478 defined thereon that provide regions between the retainer and enclosure 412 through which fastener 474 passes. In the illustrated embodiment, retainer 476 includes a plurality of protrusions 478 formed in series to provide the retainer with crenulations in which fastener 474 can be retained against enclosure 412.

Figure 20:
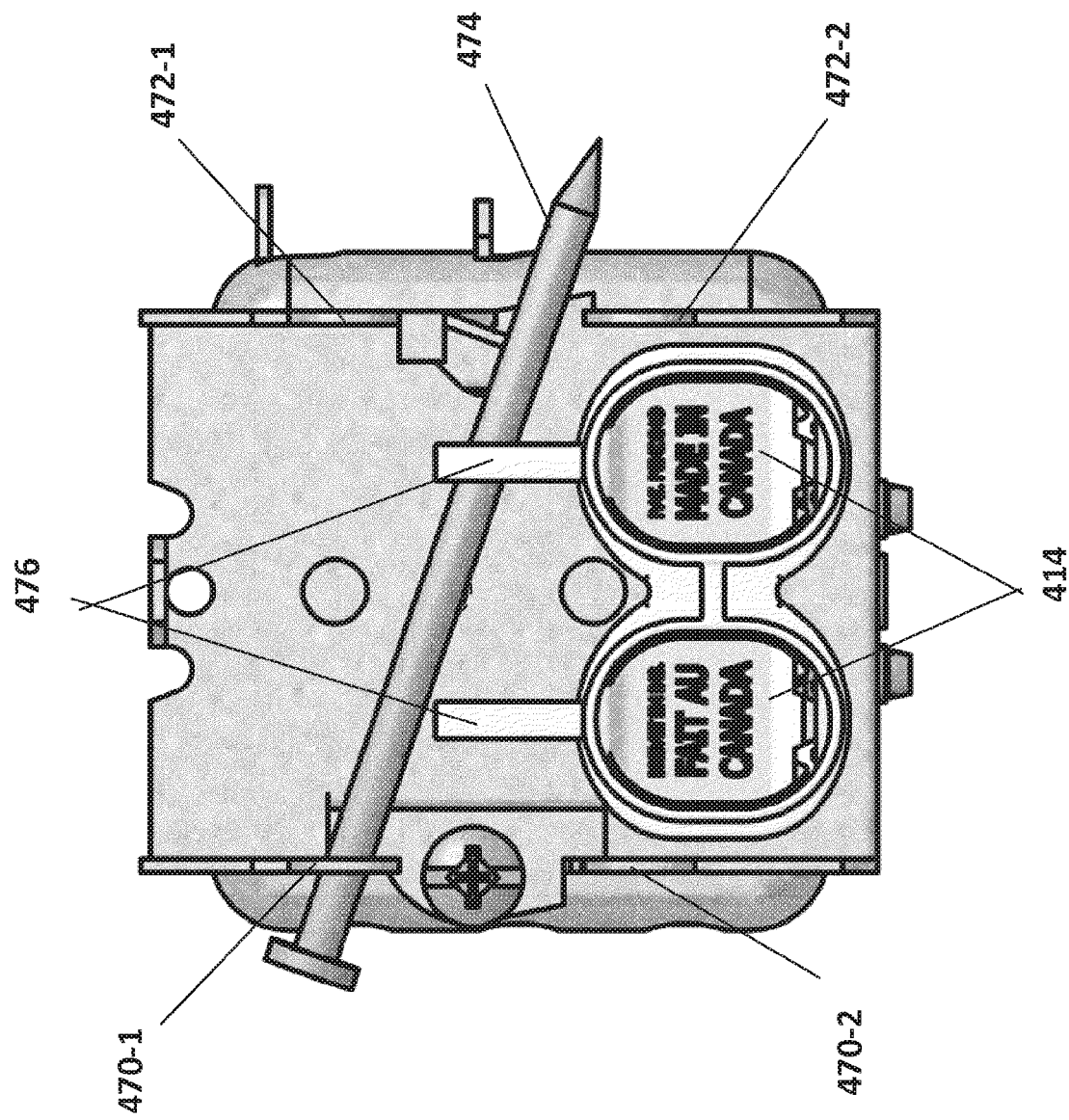
FIG. 20 is a front view of the insert of FIG. 19 in use with an enclosure of a first size.
Figure 21:
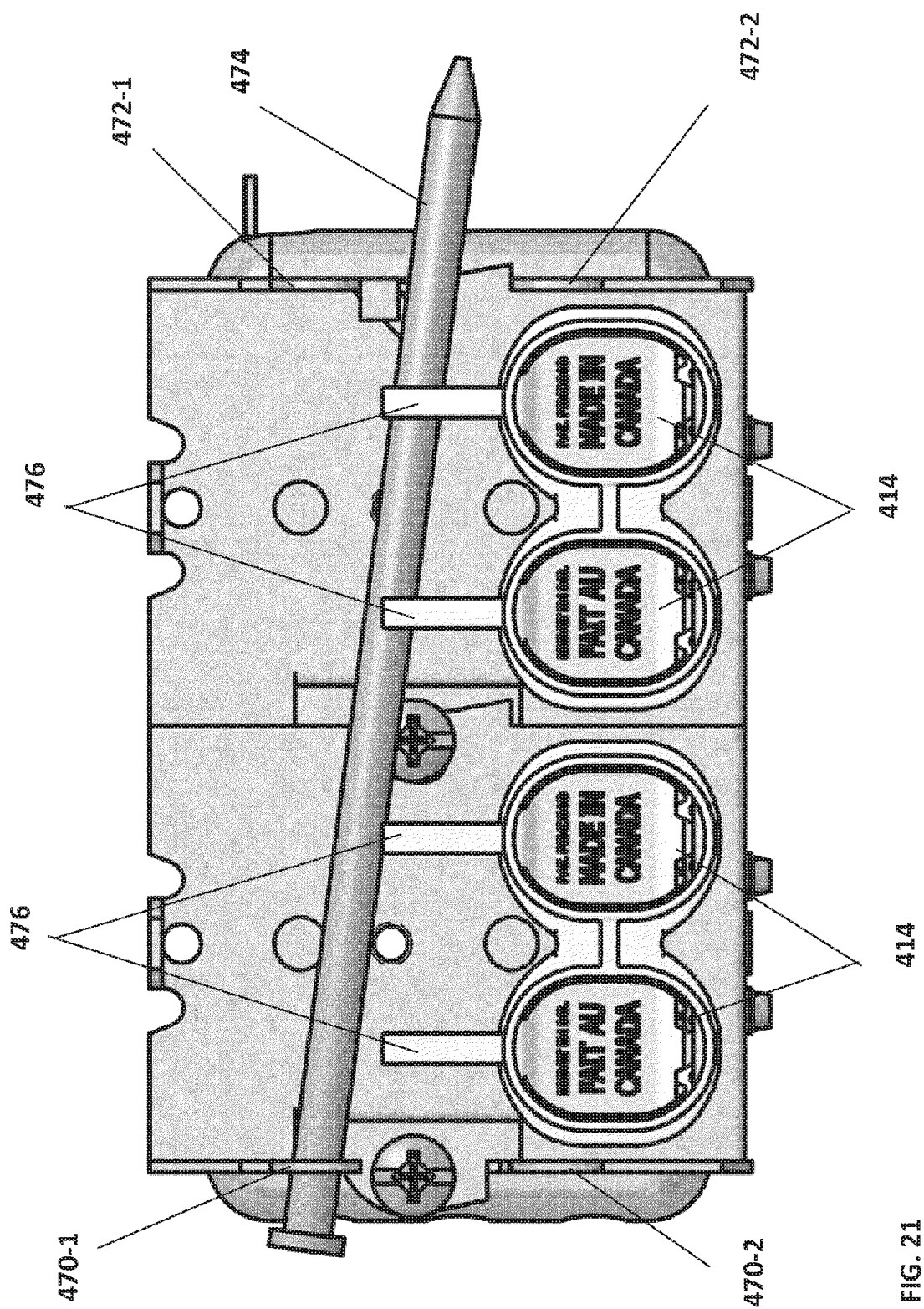
FIG. 21 is a front view of the insert of FIG. 19 in use with an enclosure of a second size.
Figure 22:
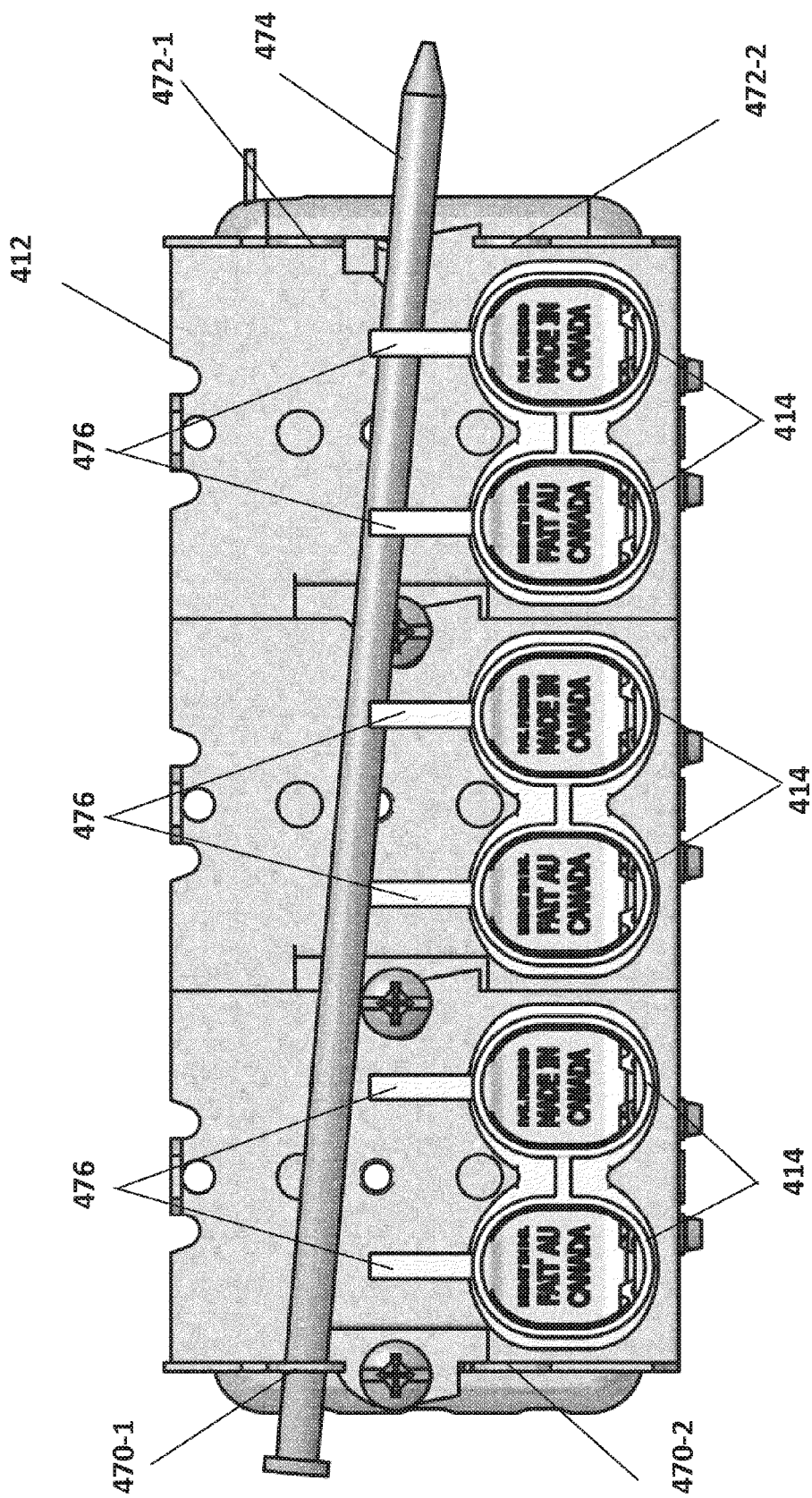
FIG. 22 is a front view of the insert of FIG. 19 in use with an enclosure of a third size.

In comparing the enclosures 412 of FIGS. 20-22, it can be seen that the configuration of the enclosure affects where fastener 474 is retained by inserts 414. Stated another way and when using inserts 414 having retainers 476, the configuration of enclosure 412 affects which of the retainers compress fastener 474 against the closure.

Figure 23:
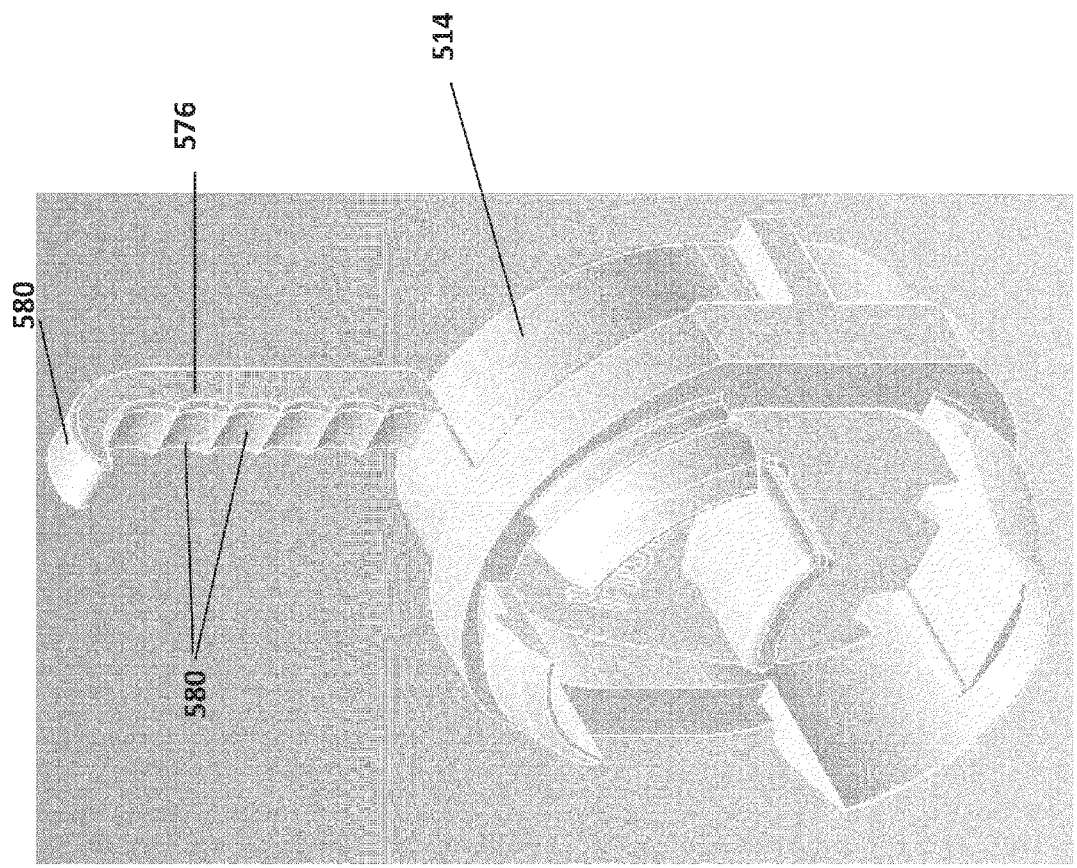
FIG. 23 is a rear isometric view of yet another exemplary embodiment of an insert according to the present disclosure.
Figure 24:
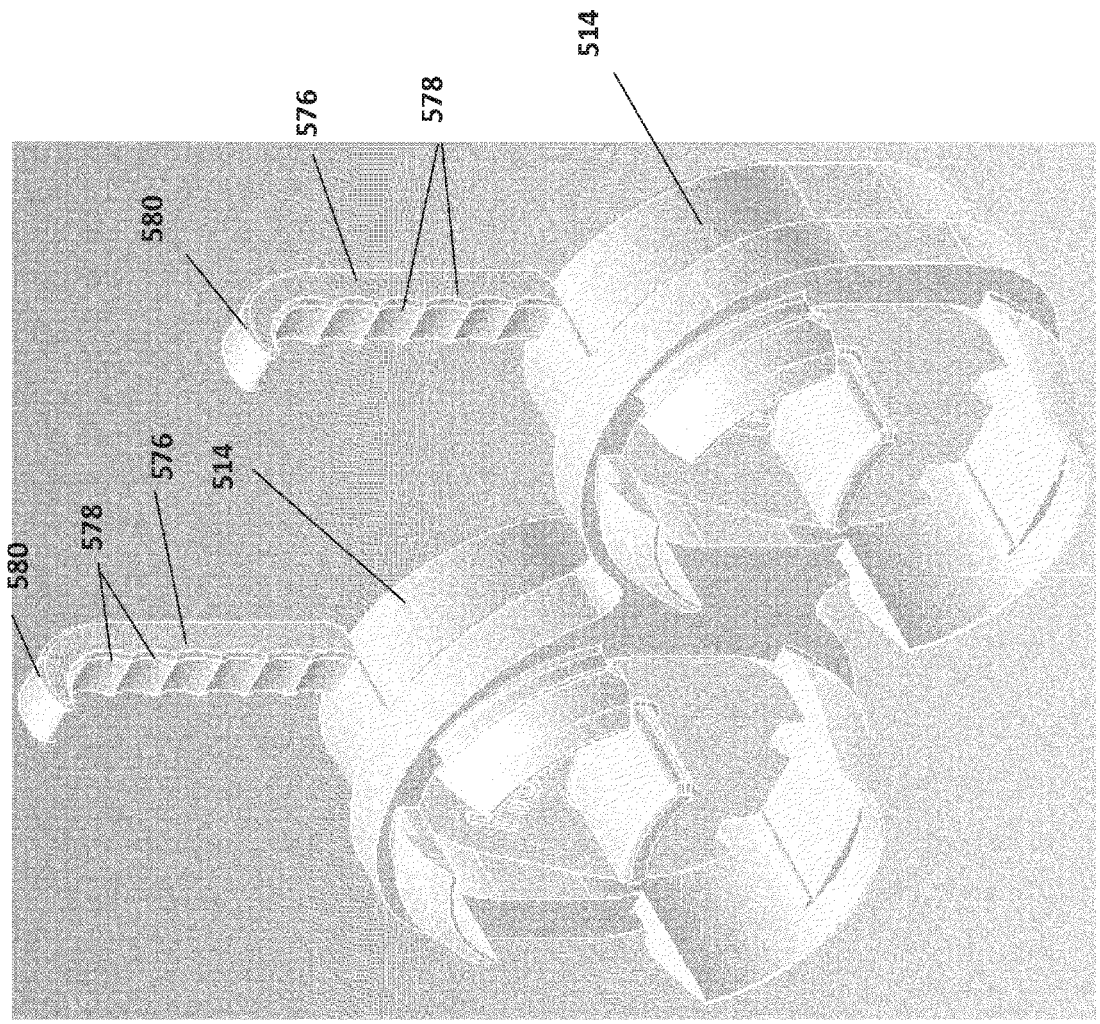
FIG. 24 is a rear isometric view of yet another exemplary embodiment of an insert according to the present disclosure.

Referring now to FIGS. 23 and 24, another exemplary embodiment of an insert according to the present disclosure is shown and is generally referred to by reference numeral 514. Insert 514 is shown in single form in FIG. 23 and double form in FIG. 24. Here, component parts performing similar or analogous functions to those discussed above with respect to inserts 14, 114, 214, 314 and/or 414 are labeled in multiples of 500.

Similar to insert 414 discussed above, insert 514 includes fastener retainer 576—that may or may not provide resilient the retaining capabilities discussed above with respect to some embodiments of retainer 476. Additionally, retainer 576 can include protrusions 578 formed in series to provide the retainer with crenulations in which a fastener can be retained against an enclosure. In this embodiment, retainer 576 includes a terminal end having a fastener retaining hook or curve 580 positioned to prevent or at least mitigate instances of the fastener slipping from between the retainer and the enclosure.

Figure 25:
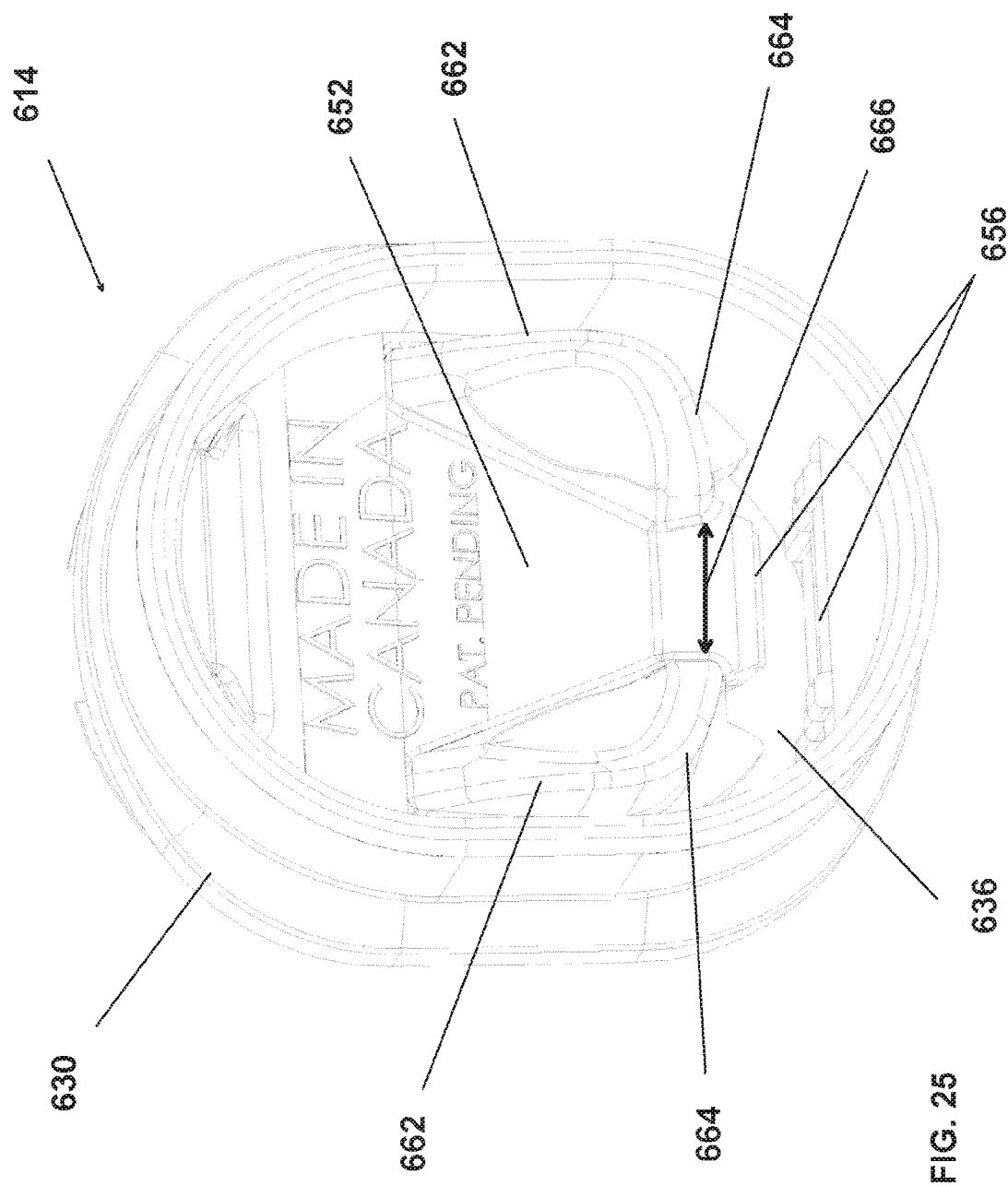
FIG. 25 is a front isometric view of an alternate exemplary embodiment of an insert according to the present disclosure.
Figure 26:
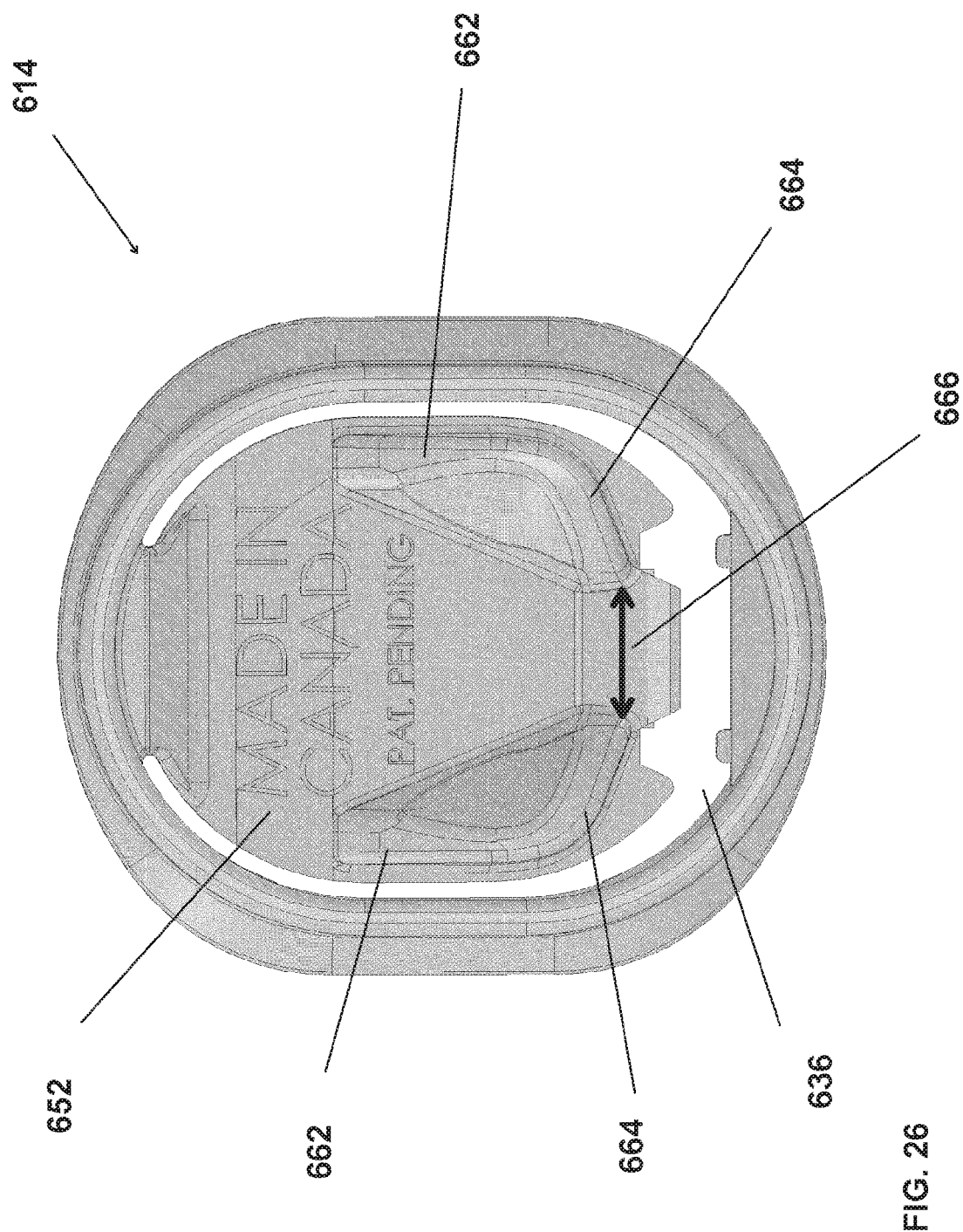
FIG. 26 is a front view of the insert of FIG. 25.
Figure 27:
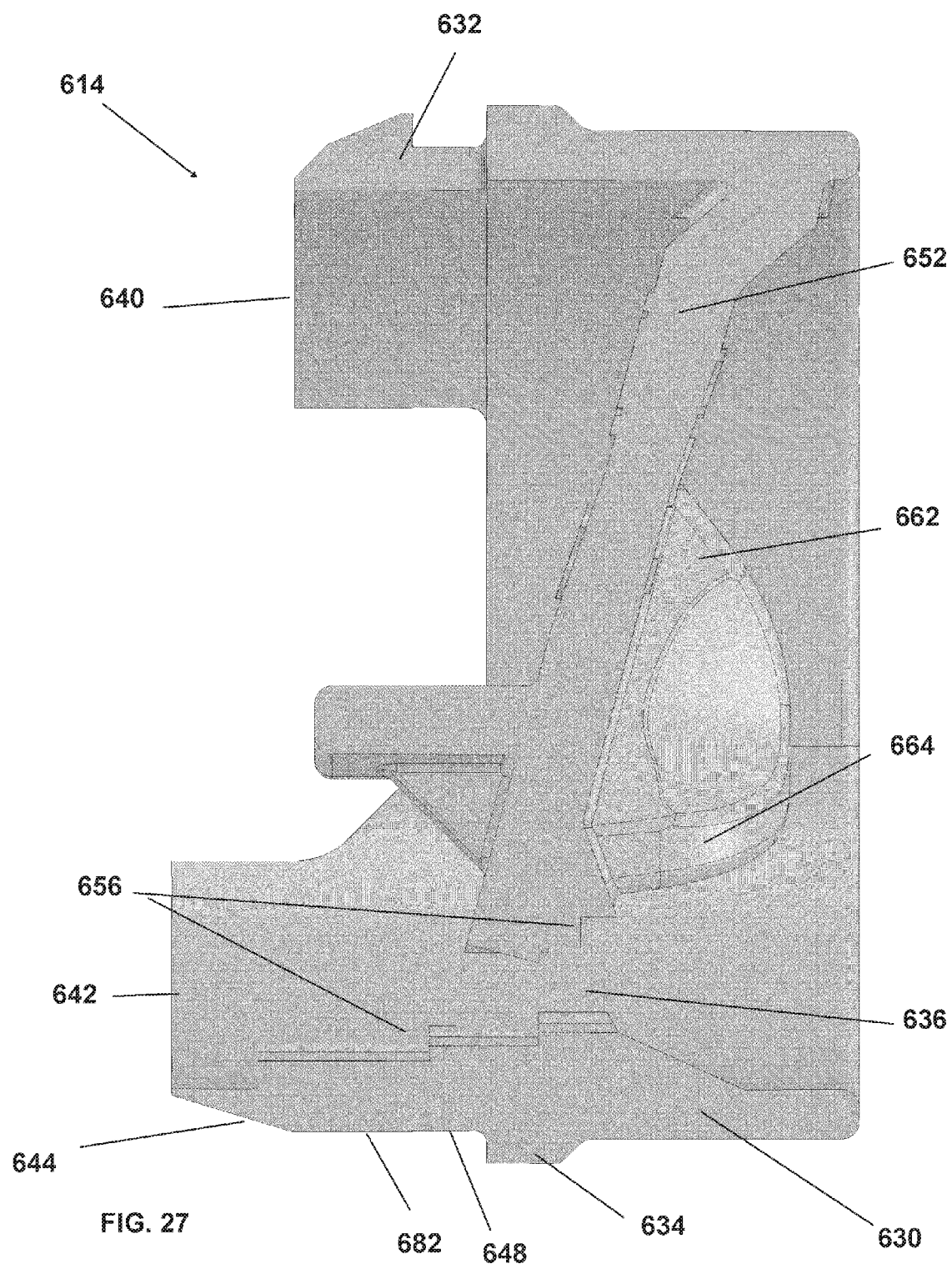
FIG. 27 is a sectional view of the insert of FIG. 25 before installation of a cable.
Figure 28:
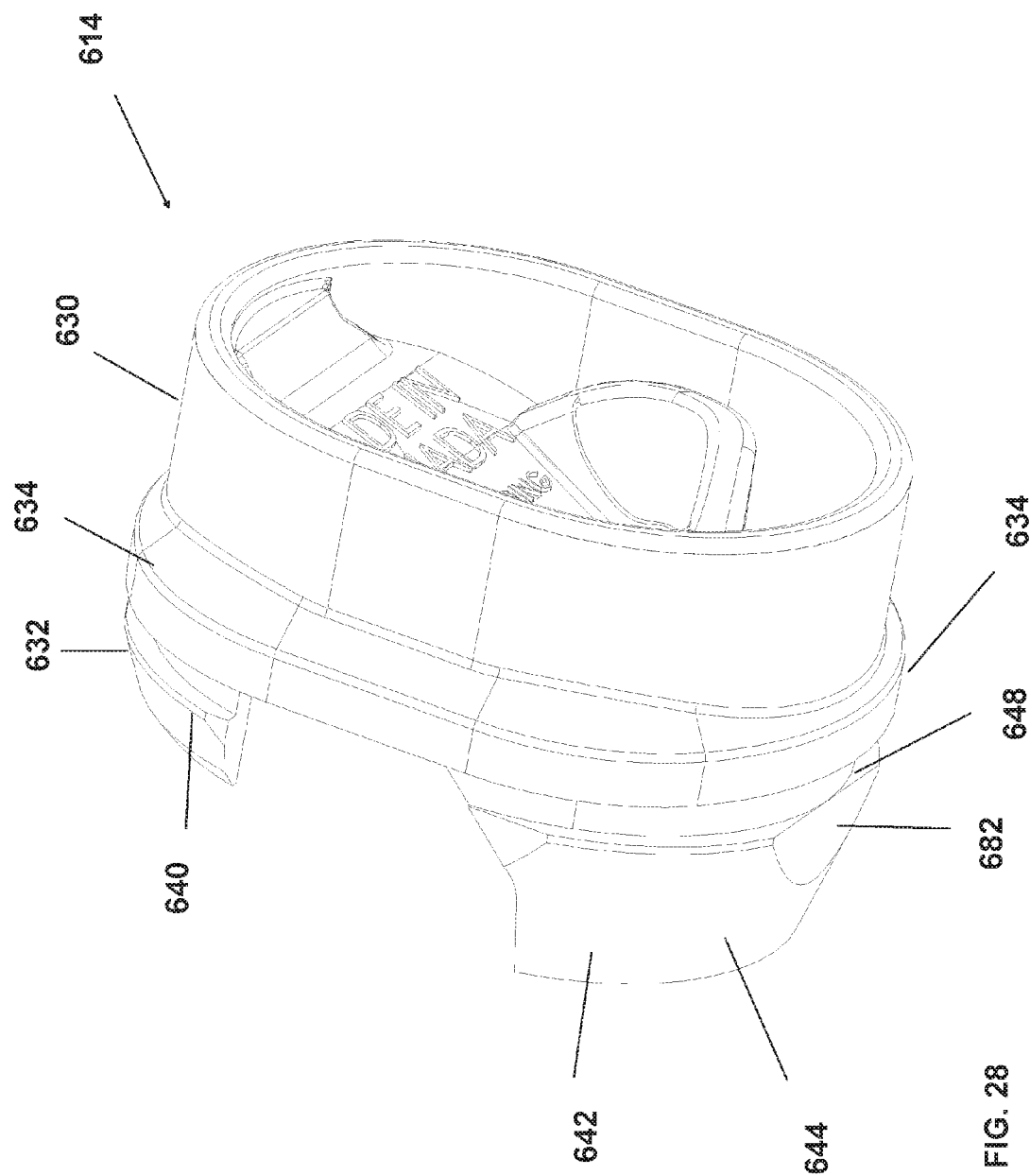
FIG. 28 is a bottom isometric view of the insert of FIG. 25.

Referring now to FIGS. 25-25, another alternate exemplary embodiment of an insert according to the present disclosure is shown and is generally referred to by reference numeral 614. In this embodiment of insert 614 component parts performing similar or analogous functions to those discussed above with respect to inserts 14, 114, 214, 314, 414, and/or 514 are labeled in multiples of 600. For clarity of discussion, insert 614 is shown in single form. Of course, it is contemplated by the present disclosure for insert 614 to have any desired form such as the double form of FIG. 8, the triple form of FIG. 9, and others.

Insert 614—much like insert 214 of FIGS. 13-15—includes a flap or door 652 that has a pair of lateral extensions 662 defined thereon and extending towards external portion 630. Extensions 662 are sized and positioned and configured so that, when flap 652 is pivoted inward after insertion of the cable, the extensions reduce the area of open space through cable passing opening 636. Stated another way, extensions 662 cover or shield the side edges of the cable as it passes through opening 636, while flap 652 covers or shields the top edge of the cable and the lower surface of insert 614 covers or shields the bottom edge of the cable.

Additionally, insert 614 further includes curved end regions 664 depending from extensions 662. End regions 664 provide an area of reduced cross section 666 that provides further cover or shield to the side edges of the cable passing through opening 636 and assists in gripping and/or guiding the cable. In some embodiments, end regions 664 can be tapered to further assist in guiding the cable through opening 636.

In some embodiments, one or more of external portion 630, flap 652, extensions 662 (not shown), and regions 664 (not shown) can include one or more ramps or teeth 656 disposed thereon which act together to apply friction to the cable so as to prevent or at least mitigate the cable from being inadvertently withdrawn from opening 636. The ramps 656, when present, can be provided, at different levels to provide friction for various sizes of the cable.

Insert 614 includes internal portion 632 with one or more upper retaining clips 640 (two shown) and one or more lower retaining clip 642 (one shown). Clips 640, 642 are cantilevered beams depending from stop ring 634 and include cam surface 644 defining enclosure receiving slot 648. In the illustrated embodiment, insert 614 further includes a relief 682 formed in cam surface 644 at the bottom most region (i.e., along the minor axis) of lower retaining clip 642.

Without wishing to be bound by any particular theory, the span of lower retaining clip 642 (i.e., the portion of the circumference of internal portion 632 that includes the lower retaining clip) can make deflection of the clip difficult during insertion. Relief 682 is believed to reduce the force necessary to install insert 614 by eliminating the need for deflection of lower retaining clip 642 upwardly during installation, while allowing the remaining portions of the lower retaining clip (i.e., the vertical walls) to inwardly deflect towards one another.

Insert 14, 114, 214, 314, 414, 514, 614 can be made of any material having sufficient strength and resiliency to withstand the installation into enclosure 12 and the installation of cable 16 therethrough. In some embodiments, insert 14, 114, 214, 314, 414, 514, 614 is a single piece injection molded member formed of thermoplastic polymers, thermoset polymers, and other materials. In some embodiments, insert 14, 114, 214, 314, 414, 514, 614 is molded NORYL™ Resin SE100X.

Accordingly and as described herein, assembly 10 provides, in some embodiments, enclosure 12 with a manufacturer installed oval shape cable clamping insert 14, 114, 214, 314, 414, 514, 614 fix various sizes of non-metallic sheeted cables 16. As used herein, the term "manufacture installed" means that the force necessary in install insert 14, 114, 214, 314, 414, 514, 614 into enclosure is at least 50 pounds, with above 150 pounds being considered.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST enclosure assembly 10
enclosure 12
cable clamping insert 14
cable 16
opening 18
major and minor axes 20, 22
rear surface 24
first or external portion 30
second or internal portion 32
stop ring 34
cable passing opening 36
outer surface 38
upper retaining clip 40
lower retaining clip 42
cam surface 44
locking surface 46
enclosure receiving slot 48
inner surface 50
flap or door 52
living hinge 54
ramps or teeth 56
grip 58
web 60
cable clamping insert 114
first or external portion 130
cable passing opening 136
flap or door 152
ramps or teeth 156
lateral extension 162
insert 214
flap or door 252
lateral extensions 262
external portion 230
cable passing opening 236
ramps or teeth 256
curved end regions 264
area 266
insert 314
flap or door 352
lateral extensions 362
cable passing opening 336
ramps or teeth 356
curved end regions 364
area 366
insert 414
enclosures 412
fastener opening 470-1, 470-2
fastener opening 472-2, 472-2
fastener 474
fastener retainers 476
protrusions 478
insert 514
fastener retainer 576
protrusions 578
hook 580
insert 614
flap or door 652
lateral extensions 662
external portion 630
opening 636
curved end regions 664
ramps or teeth 656
internal portion 632
upper retaining clips 640
lower retaining clip 642
stop ring 634
cam surface 644
receiving slot 648
relief 682

What is claimed is:

1. An enclosure assembly, comprising:
an enclosure having a rear surface and an enclosure opening defined through at least one wall;
a cable clamping insert having an internal portion separated from an external portion by a ring stop and a cable passing opening defined therethrough, the internal portion having one or more upper retaining clips and one or more lower retaining clips, the upper and lower retaining clips having a cam surface and a locking surface, the cable clamping insert being disposed in the enclosure opening with the one or more retaining clips proximate the rear surface so that the wall of the enclosure is disposed in a slot defined between the locking surfaces and the ring stop, the external portion having a living hinge resiliently securing a flap thereto so that the flap normally closes the cable passing opening.

2. The enclosure assembly of claim 1, wherein the enclosure opening and the cable clamping insert are oval having a minor axis and a major axis.

3. The enclosure assembly of claim 2, wherein the one or more upper retaining clips comprises two upper retaining clips.

4. The enclosure assembly of claim 3, wherein the one or more lower retaining clips comprises one lower retaining clip.

5. The enclosure assembly of claim 4, wherein each of the two upper retaining clips partially circumvent the major axis and partially circumvent the minor axis, and wherein the one retaining clip partially circumvents the major axis along both sides and completely circumvents the minor axis.

6. The enclosure assembly of claim 5, wherein the lower retaining clip comprises a relief in the cam surface along the minor axis.

7. The enclosure assembly of claim 1, wherein the one or more lower retaining clips are longer than the one or more upper retaining clips.

8. The enclosure assembly of claim 1, further comprising lateral extensions defined on the flap extending towards the external portion.

9. The enclosure assembly of claim 8, wherein the lateral extensions further comprise curved end regions defining an area of reduced cross section.

10. The enclosure assembly of claim 1, further comprising one or more fastener retainers configured retain a portion of an enclosure fastener.

11. The enclosure assembly of claim 10, wherein the one or more fastener retainers are configured to resiliently retain the enclosure fastener against the enclosure.

12. The enclosure assembly of claim 10, wherein the one or more fastener retainers further comprise a plurality of protrusions formed in series.

13. The enclosure assembly of claim 10, wherein the one or more fastener retainers further comprise a terminal end having a retainer capturing hook or curve.

14. A cable clamping insert, comprising:
an internal portion having one or more upper retaining clips and one or more lower retaining clips, the upper and lower retaining clips having a cam surface and a locking surface;
an external portion having a living hinge resiliently securing a flap thereto;
a ring stop separating the internal and external portions, a slot defined between the locking surfaces and the ring stop; and
a cable passing opening defined through the internal portion, the external portion, and the ring stop.

15. The insert of claim 14, wherein the internal portion, the external portion, and the ring stop are oval having a minor axis and a major axis.

16. The insert of claim 15, wherein the one or more upper retaining clips comprises two upper retaining clips.

17. The insert of claim 16, wherein the one or more lower retaining clips comprises one lower retaining clip.

18. The insert of claim 17, wherein each of the two upper retaining clips partially circumvent the major axis and partially circumvent the minor axis, and wherein the one lower retaining clip partially circumvents the major axis along both sides and completely circumvents the minor axis.

19. The insert of claim 18, wherein the lower retaining clip comprises a relief in the cam surface along the minor axis.

20. The insert of claim 14, further comprising lateral extensions defined on the flap extending towards the external portion.

21. The enclosure assembly of claim 20, wherein the lateral extensions further comprise curved end regions defining an area of reduced cross section.

\* \* \* \* \*